(12) United States Patent
Yoshida et al.

(10) Patent No.: US 8,812,780 B2
(45) Date of Patent: Aug. 19, 2014

(54) RAID GROUP CONTROL DEVICE

(75) Inventors: Masahiro Yoshida, Kawasaki (JP);
Tadashi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 13/563,023

(22) Filed: Jul. 31, 2012

(65) Prior Publication Data

US 2013/0080700 A1    Mar. 28, 2013

(30) Foreign Application Priority Data

Sep. 27, 2011    (JP) .................................. 2011-210977

(51) Int. Cl.
*G06F 12/02*    (2006.01)
*G06F 3/06*    (2006.01)

(52) U.S. Cl.
CPC .................... *G06F 3/0689* (2013.01)
USPC ........................................................ 711/114

(58) Field of Classification Search
CPC ................................................... G06F 3/0689
See application file for complete search history.

(56) References Cited

U.S. PATENT DOCUMENTS

| | | | |
|---|---|---|---|
| 7,032,218 B2 | 4/2006 | Shirasawa et al. | |
| 8,108,702 B2 | 1/2012 | Yoshida et al. | |
| 8,694,602 B2 * | 4/2014 | Fukuguchi et al. | 709/217 |
| 2007/0061513 A1 * | 3/2007 | Tsumagari et al. | 711/114 |
| 2008/0059718 A1 * | 3/2008 | Tajima et al. | 711/148 |
| 2009/0077547 A1 | 3/2009 | Kakinoki | |
| 2011/0246730 A1 * | 10/2011 | Yoshida et al. | 711/156 |
| 2011/0264854 A1 * | 10/2011 | Ouchi | 711/114 |
| 2011/0264943 A1 * | 10/2011 | Hori et al. | 713/324 |
| 2011/0314220 A1 * | 12/2011 | Matsumura et al. | 711/114 |

FOREIGN PATENT DOCUMENTS

| | | |
|---|---|---|
| JP | 2002-318666 | 10/2002 |
| JP | 2008-250945 | 10/2008 |
| JP | 2009-075716 | 4/2009 |

* cited by examiner

*Primary Examiner* — Hiep Nguyen
(74) *Attorney, Agent, or Firm* — Fujitsu Patent Center

(57) ABSTRACT

A RAID group control device for performing access control over one or more RAID groups each having redundancy. The RAID group control device includes an acquiring unit to acquire access frequency information with respect to a RAID group among the one or more RAID groups; a scheduling unit to find a time period exhibiting a lower access frequency than access frequencies of anterior and posterior time periods in a specified time range on the basis of the access frequency information, and to determine start timing of a process of rewriting firmware of drives belonging to the RAID group on the basis of the found time period; and a firmware rewrite processing unit to start the process of rewriting the firmware of the drives at the determined start timing.

10 Claims, 30 Drawing Sheets

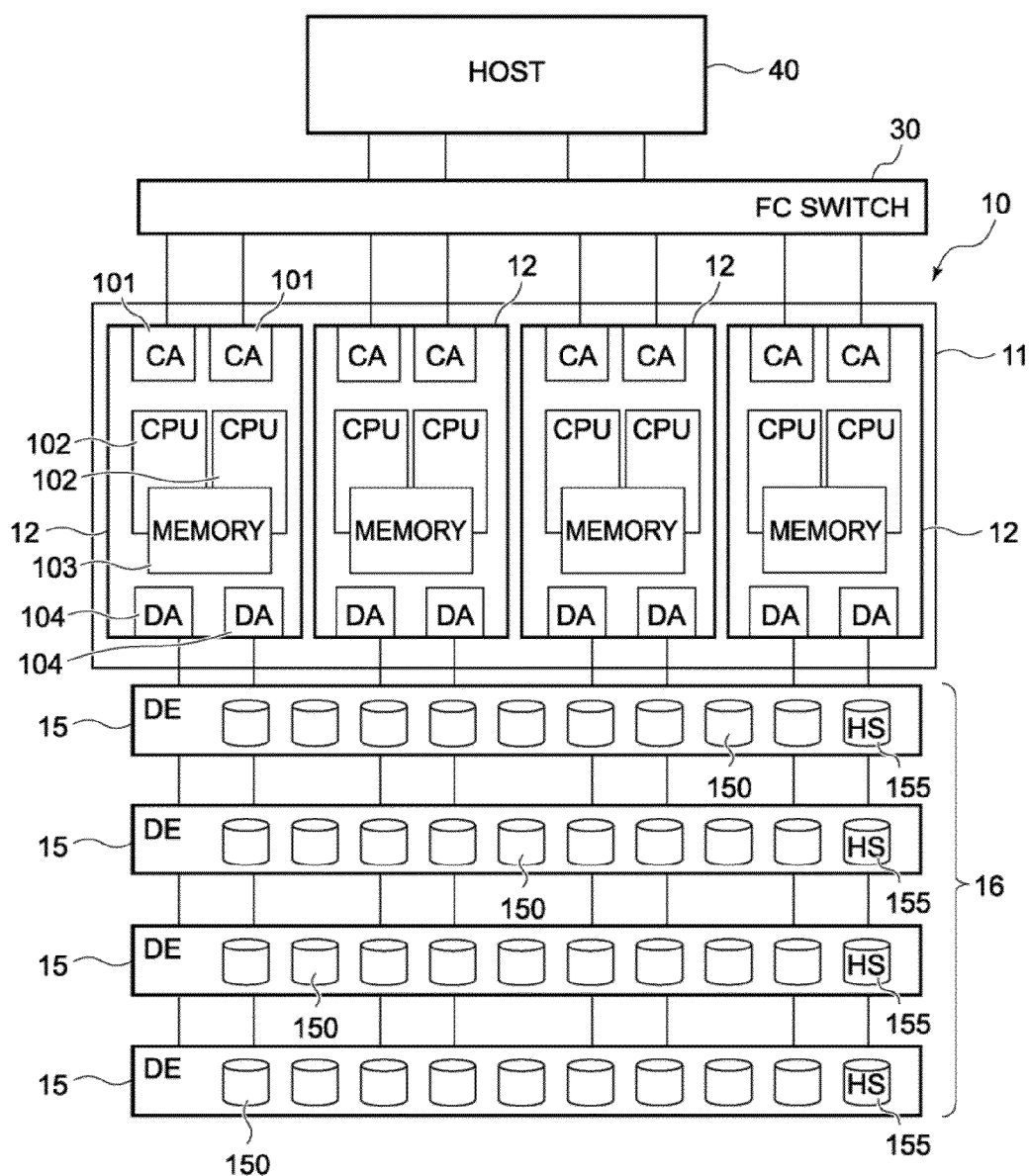

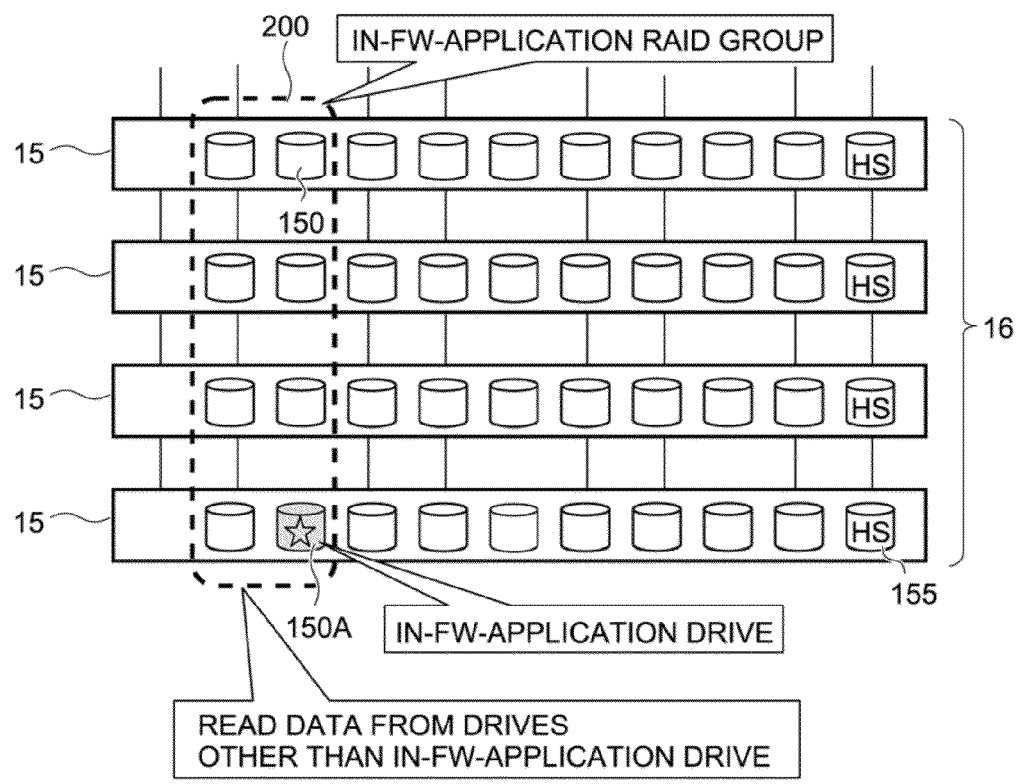

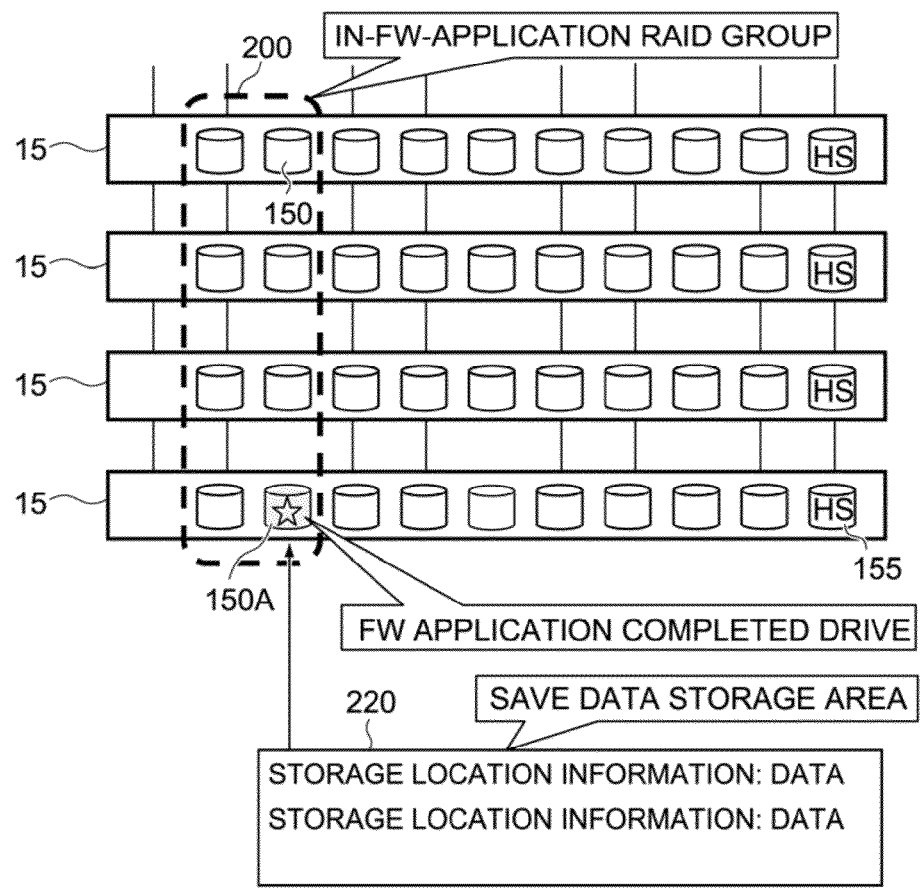

FIG. 6

| TIME | ACCESS COUNT |
|---|---|
| 00:00:00 | 9 |
| 00:01:00 | 7 |
| 00:02:00 | 16 |
| ⋮ | ⋮ |

| TIME PERIOD | ACCESS COUNT | ACCESS RANK |
|---|---|---|
| 00:00:00 - 00:30:00 | 265 | B |
| 00:30:00 - 01:00:00 | 203 | B |
| 01:00:00 - 01:30:00 | 429 | A |
| ⋮ | ⋮ | ⋮ |

| TIME PERIOD / RANK | OLD RANK | CALCULATED RANK | UPDATED RANK |
|---|---|---|---|
| 00:00:00 - 00:30:00 | B | A | A |
| 00:30:00 - 01:00:00 | B | A | A |
| 01:00:00 - 01:30:00 | B | B | B |
| 01:30:00 - 02:00:00 | A | C | B |
| 02:00:00 - 02:30:00 | A | C | B |
| ⋮ | ⋮ | ⋮ | ⋮ |

FIG. 9

| TIME PERIOD / RAID-G | RAID GROUP 1 | RAID GROUP 2 | RAID GROUP 3 | RAID GROUP 4 |
|---|---|---|---|---|
| 00:00:00 - 00:30:00 | A | D | A | B |
| 00:30:00 - 01:00:00 | B | D | A | B |
| 01:00:00 - 01:30:00 | B | D | A | C |
| 01:30:00 - 02:00:00 | A | D | A | C |
| ⋮ | ⋮ | ⋮ | ⋮ | ⋮ |

60

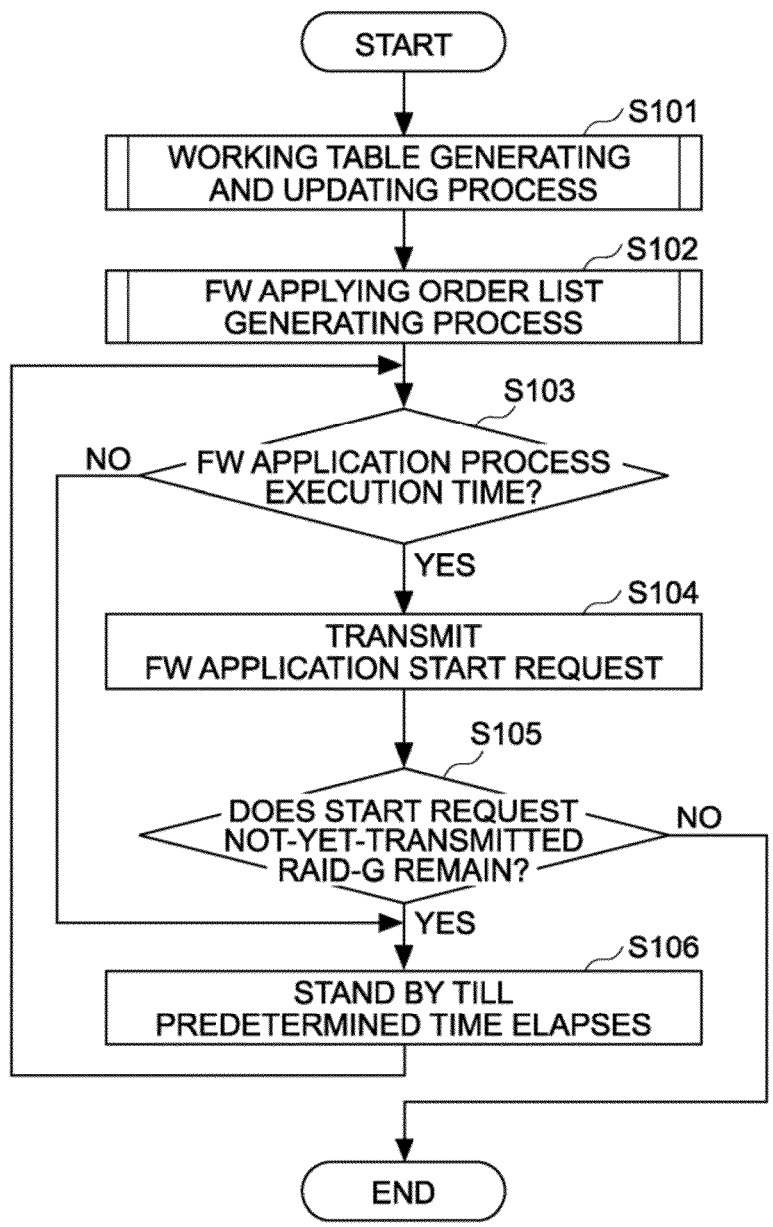

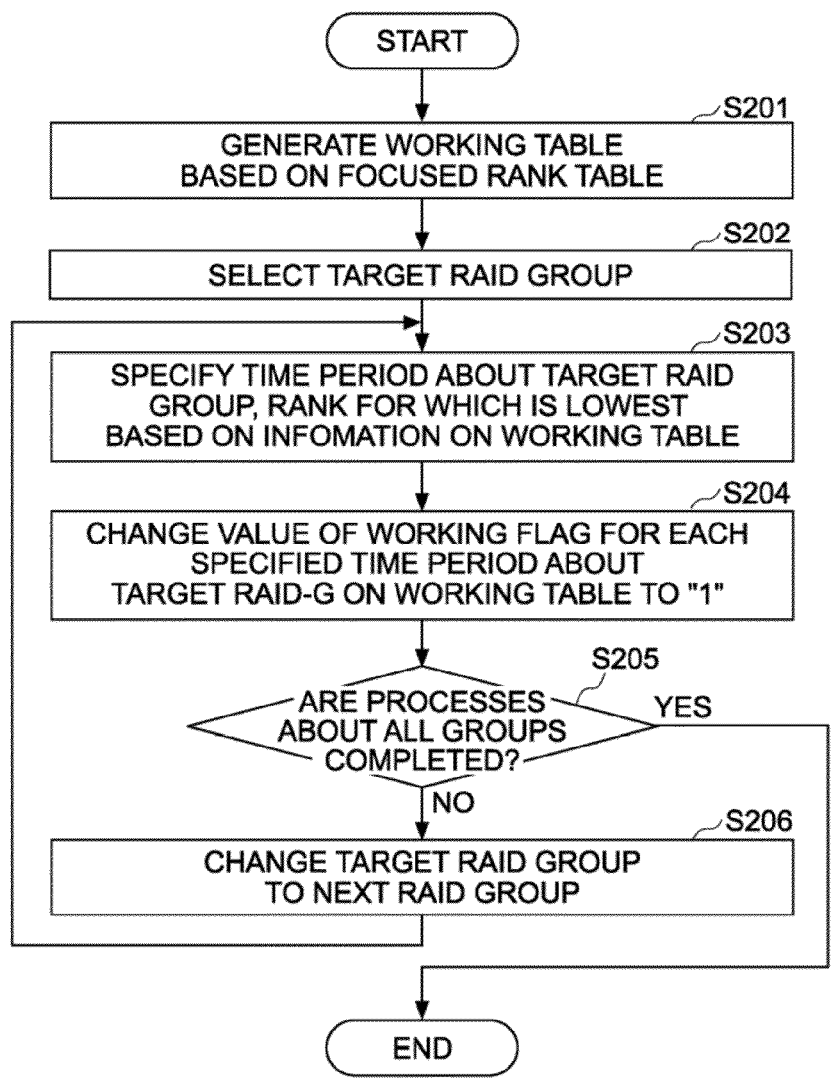

FIG. 12A

| TIME PERIOD | RAID GROUP 1 NOT-YET-DETERMINED | | RAID GROUP 2 NOT-YET-DETERMINED | | RAID GROUP 3 NOT-YET-DETERMINED | | RAID GROUP 4 NOT-YET-DETERMINED | |
|---|---|---|---|---|---|---|---|---|
| | RANK | WORK-F | RANK | WORK-F | RANK | WORK-F | RANK | WORK-F |
| 00:00:00 - 00:30:00 | A | 0 | D | 0 | A | 0 | B | 0 |
| 00:30:00 - 01:00:00 | B | 0 | D | 0 | A | 0 | B | 0 |
| 01:00:00 - 01:30:00 | B | 0 | D | 0 | A | 0 | C | 0 |
| 01:30:00 - 02:00:00 | A | 0 | D | 0 | A | 0 | C | 0 |
| ... | ... | ... | ... | ... | ... | ... | ... | ... |

FIG. 12B

| TIME PERIOD | RAID GROUP 1 NOT-YET-DETERMINED | | RAID GROUP 2 NOT-YET-DETERMINED | | RAID GROUP 3 NOT-YET-DETERMINED | | RAID GROUP 4 NOT-YET-DETERMINED | |
|---|---|---|---|---|---|---|---|---|
| | RANK | WORK-F | RANK | WORK-F | RANK | WORK-F | RANK | WORK-F |
| 00:00:00 - 00:30:00 | A | 0 | D | 1 | A | 1 | B | 0 |
| 00:30:00 - 01:00:00 | B | 1 | D | 1 | A | 1 | B | 0 |
| 01:00:00 - 01:30:00 | B | 1 | D | 1 | A | 1 | C | 1 |
| 01:30:00 - 02:00:00 | A | 0 | D | 1 | A | 1 | C | 1 |
| ... | ... | ... | ... | ... | ... | ... | ... | ... |

70

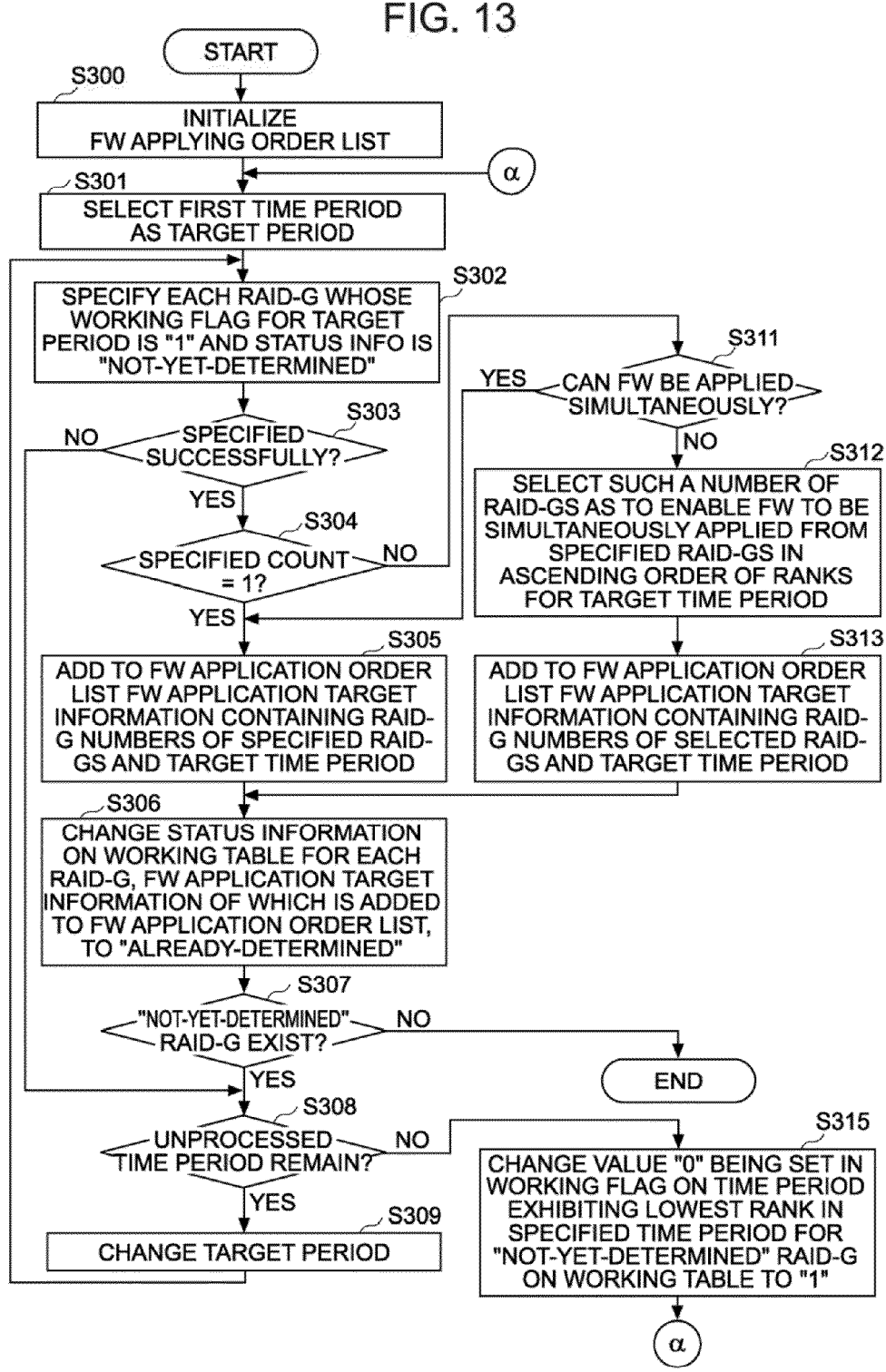

FIG. 14

| TIME PERIOD | RAID GROUP 1 NOT-YET-DETERMINED | | RAID GROUP 2 NOT-YET-DETERMINED | | RAID GROUP 3 NOT-YET-DETERMINED | | RAID GROUP 4 NOT-YET-DETERMINED | |
|---|---|---|---|---|---|---|---|---|
| | RANK | WORK-F | RANK | WORK-F | RANK | WORK-F | RANK | WORK-F |
| 00:00:00 - 00:30:00 | A | 0 | A | 0 | A | 0 | A | 0 |
| 00:30:00 - 01:00:00 | B | 1 | B | 1 | B | 1 | B | 1 |
| 01:00:00 - 01:30:00 | A | 0 | A | 0 | A | 0 | A | 0 |
| 01:30:00 - 02:00:00 | A | 0 | A | 0 | A | 0 | A | 0 |
| ... | ... | ... | ... | ... | ... | ... | ... | ... |

FIG. 17B

|  | [FIRST SEQUENCE] | [SECOND SEQUENCE] |
|---|---|---|
| RECEPTION OF REQUEST | RAID GROUP 2 (DRIVE#1) | RAID GROUP 3 (DRIVE#1) |
|  | RAID GROUP 2 (DRIVE#2) | RAID GROUP 3 (DRIVE#2) |
|  | RAID GROUP 2 (DRIVE#3) |  |
|  | RAID GROUP 2 (DRIVE#4) |  |
|  | RAID GROUP 2 (DRIVE#5) |  |
|  | RAID GROUP 2 (DRIVE#6) |  |
|  | RAID GROUP 2 (DRIVE#7) |  |
| RAID-G 2 FW APPLICATION COMPLETED | RAID GROUP 2 (DRIVE#8) |  |
|  | RAID GROUP 4 (DRIVE#1) | RAID GROUP 1 (DRIVE#1) |
|  | RAID GROUP 4 (DRIVE#2) | RAID GROUP 1 (DRIVE#2) |
|  | RAID GROUP 4 (DRIVE#3) | RAID GROUP 1 (DRIVE#3) |
|  | RAID GROUP 4 (DRIVE#4) | RAID GROUP 1 (DRIVE#4) |
|  |  | RAID GROUP 1 (DRIVE#5) |
|  |  | RAID GROUP 1 (DRIVE#6) |
| TIME (FW APPLYING ORDER) ↓ |  | RAID GROUP 1 (DRIVE#7) |
|  |  | RAID GROUP 1 (DRIVE#8) |

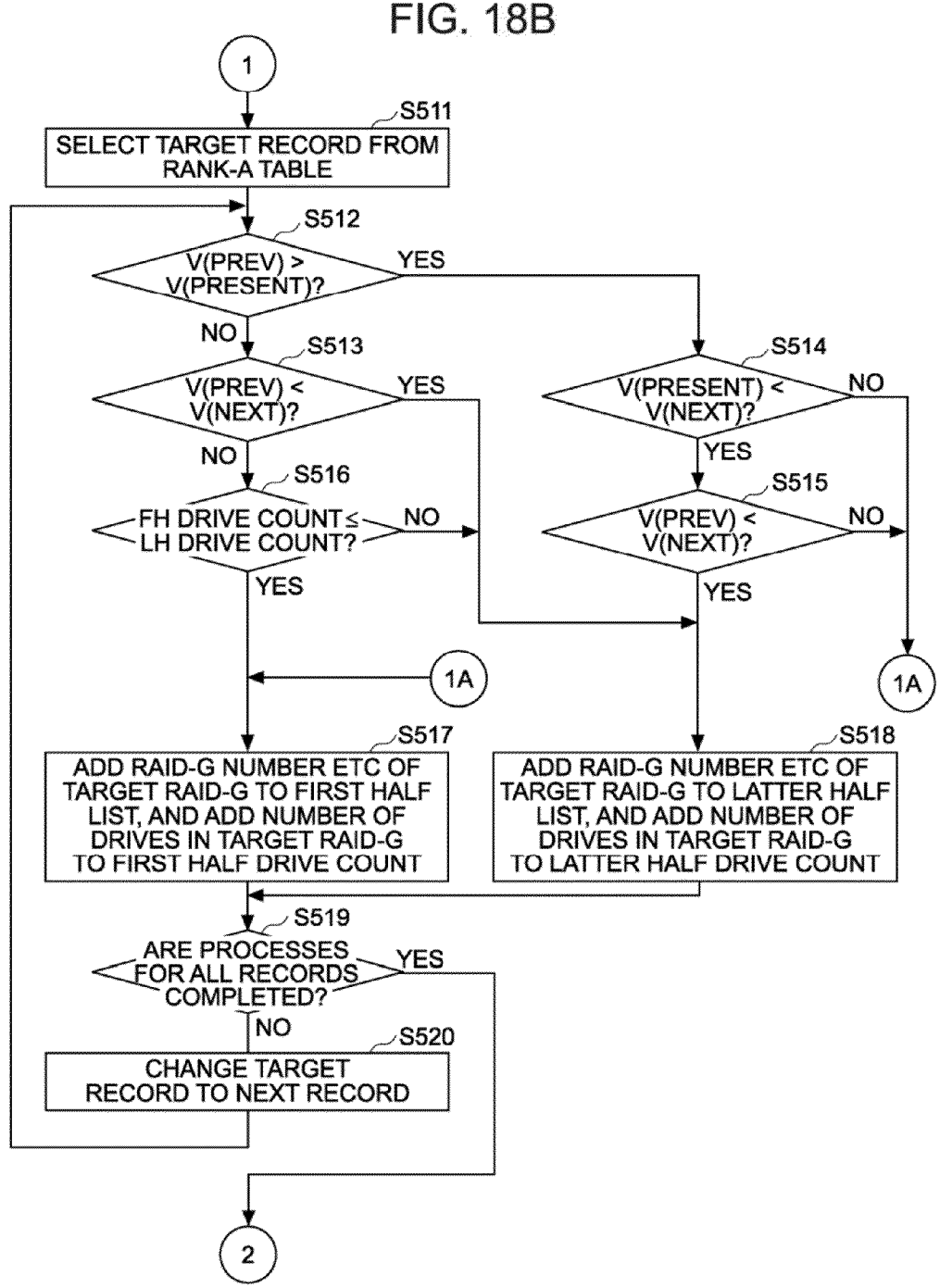

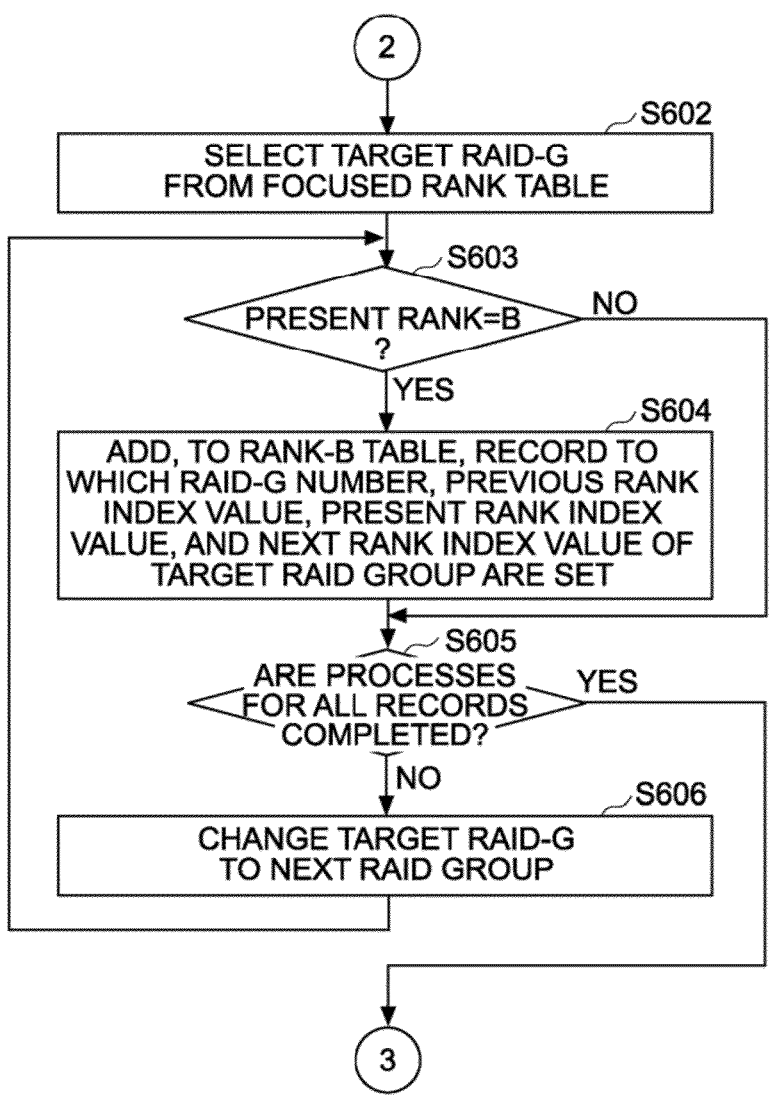

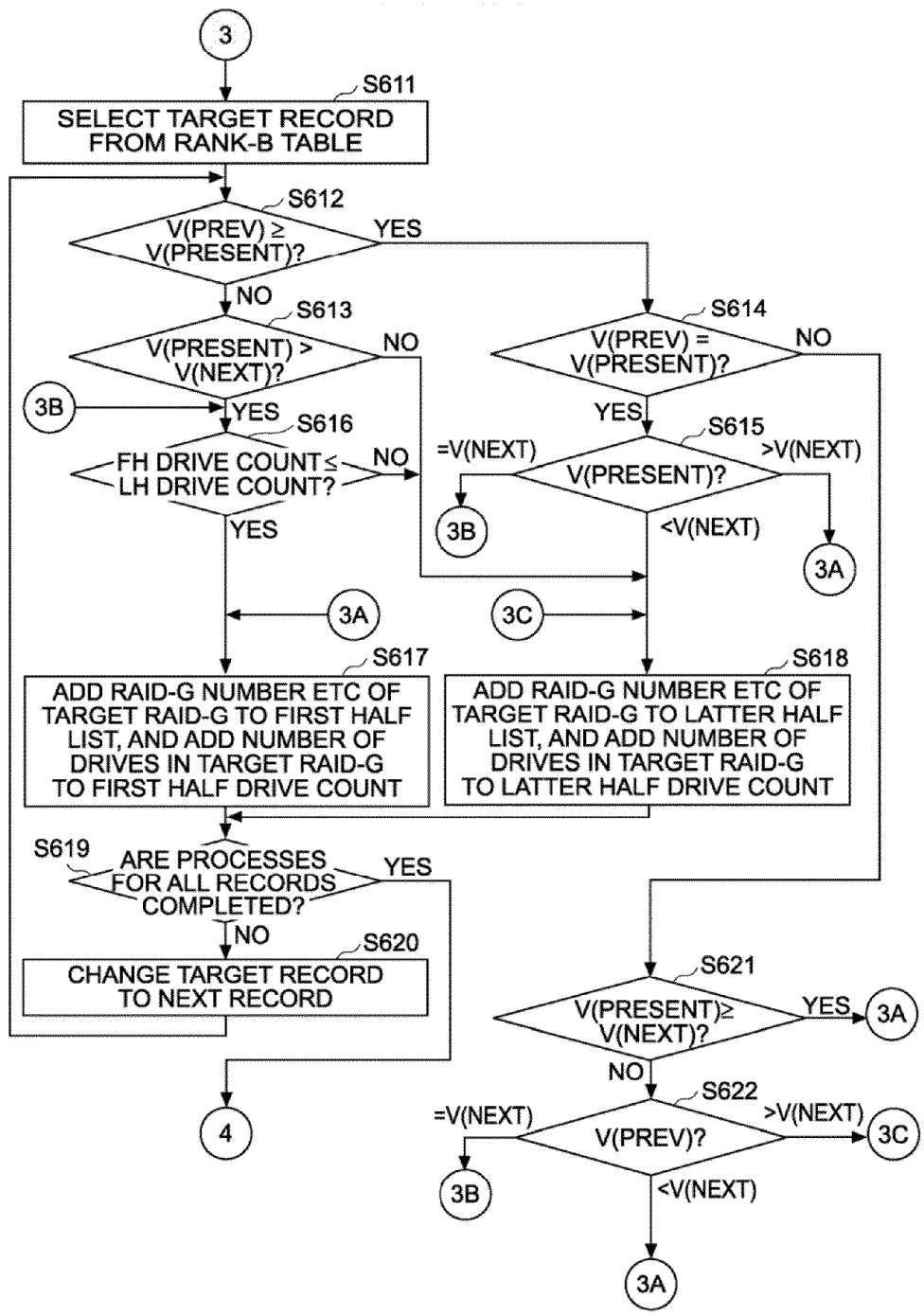

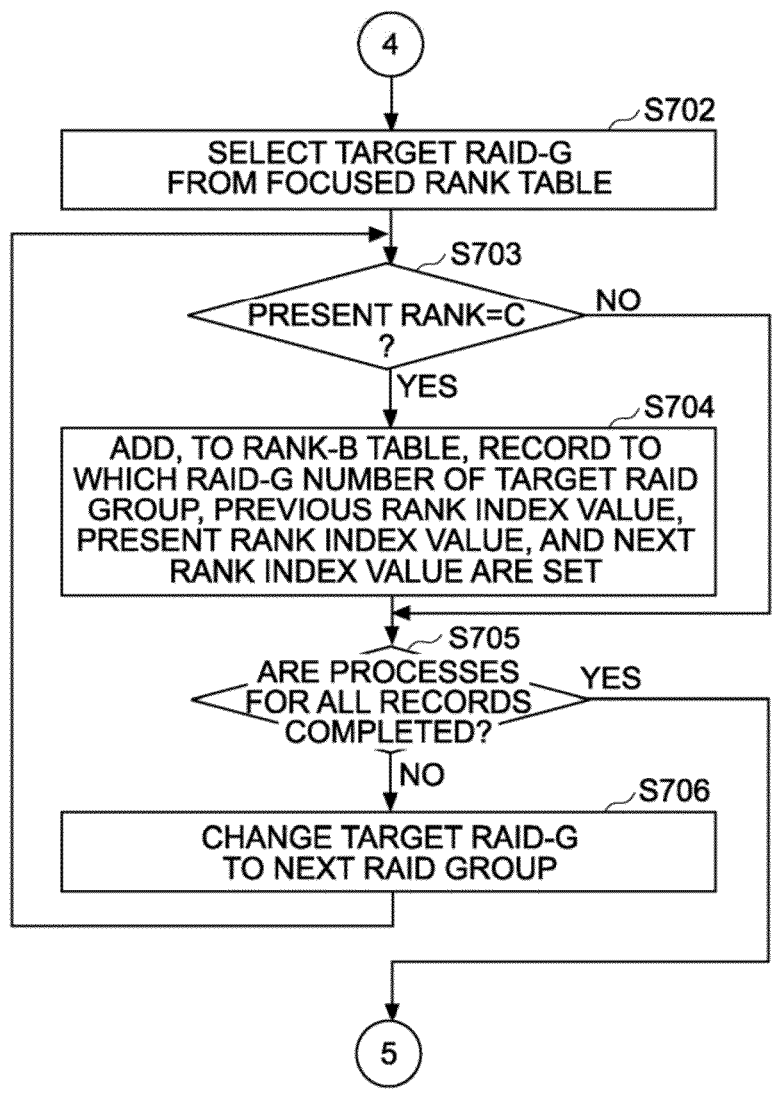

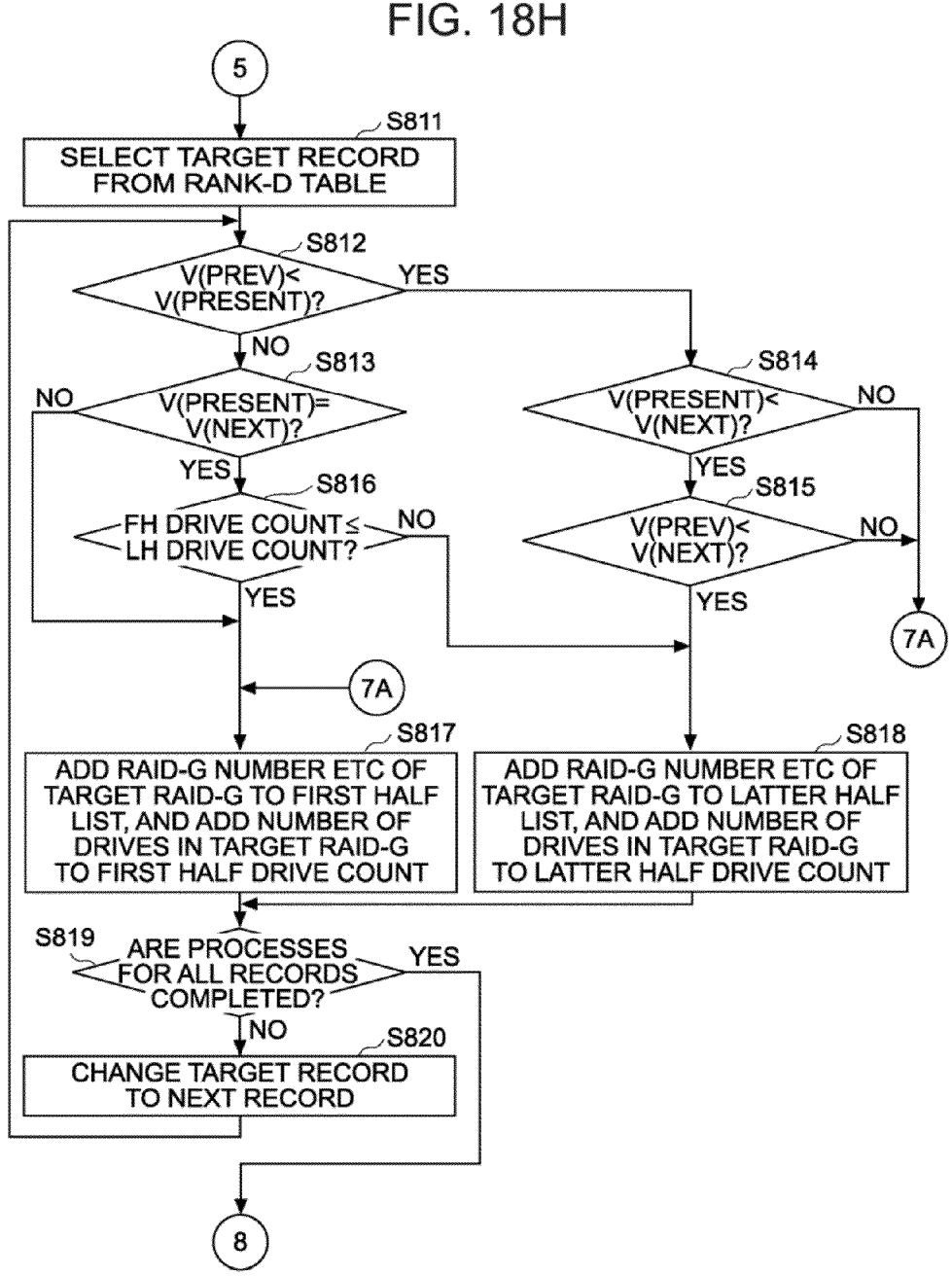

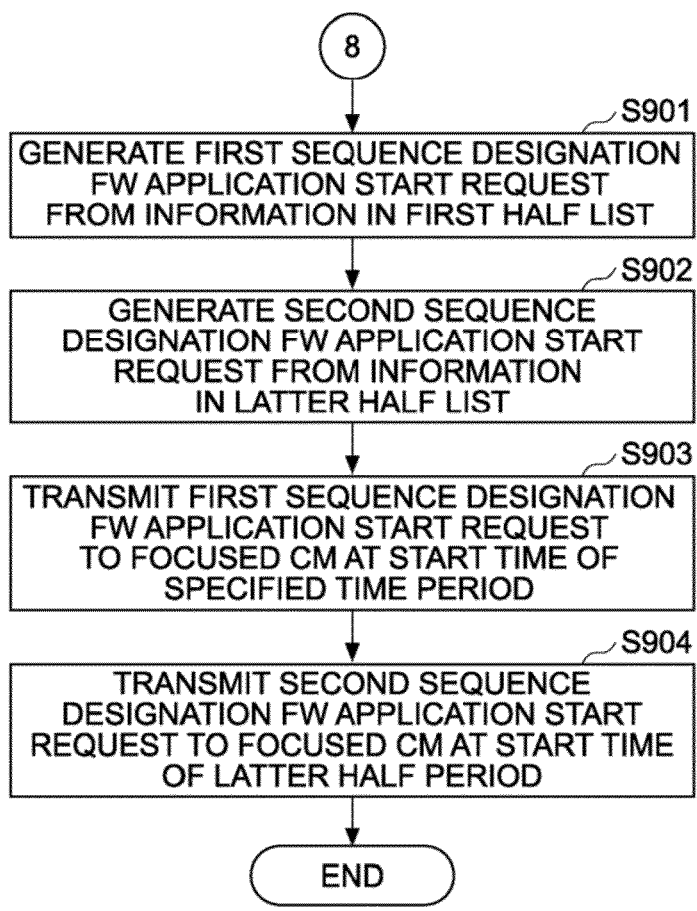

FIG. 19A

80A: RANK-A TABLE

| RAID-G NUMBER | PREVIOUS RANK INDEX VALUE | PRESENT RANK INDEX VALUE | NEXT RANK INDEX VALUE |
|---|---|---|---|
| 3 | 0 | 0 | 0 |
| ⋮ | ⋮ | ⋮ | ⋮ |

FIG. 19B

80B: RANK-B TABLE

| RAID-G NUMBER | PREVIOUS RANK INDEX VALUE | PRESENT RANK INDEX VALUE | NEXT RANK INDEX VALUE |
|---|---|---|---|
| 1 | 1 | 1 | 0 |
| ⋮ | ⋮ | ⋮ | ⋮ |

FIG. 19C

80C: RANK-C TABLE

| RAID-G NUMBER | PREVIOUS RANK INDEX VALUE | PRESENT RANK INDEX VALUE | NEXT RANK INDEX VALUE |
|---|---|---|---|
| 4 | 1 | 2 | 2 |
| ⋮ | ⋮ | ⋮ | ⋮ |

FIG. 19D

80D: RANK-D TABLE

| RAID-G NUMBER | PREVIOUS RANK INDEX VALUE | PRESENT RANK INDEX VALUE | NEXT RANK INDEX VALUE |
|---|---|---|---|
| 2 | 3 | 3 | 3 |
| ⋮ | ⋮ | ⋮ | ⋮ |

RAID GROUP CONTROL DEVICE

CROSS-REFERENCE TO RELATED APPLICATION

This application is based upon and claims the benefit of priority of the prior Japanese Patent Application No. 2011-210977, filed on Sep. 27, 2011, the entire contents of which are incorporated herein by reference.

FIELD

The present embodiment relates to a RAID (Redundant Arrays of Inexpensive (or Independent) Disks) group control device which controls a RAID group.

BACKGROUND

As broadly known, over the recent years, a disk array device including a plurality of RAID groups has come to be used for managing (keeping) data for a variety of services, and business data.

Such a type of disk array device also needs to rewrite firmware of drives (normally, hard disk drives) configuring each RAID group as the case may be. It is not, however, preferable to stop a RAID group (to set a RAID group in an inaccessible status) of the disk array device used for managing the data for the services and the business data in order to rewrite the firmware.

Then, the RAID group having redundancy (the RAID group having RAID level other than RAID 0) may function as a storage device even when stopping one single drive. A device is therefore developed, which rewrites the firmware of the drives configuring the RAID group having the redundancy without stopping the RAID group.

The existing device has, however, a possibility to cause a phenomenon such as "data lost", depending on input timing of a firmware rewrite command.

PRIOR ART DOCUMENTS

Patent document 1: Japanese Laid-Open Publication No. 2002-318666
Patent document 2: Japanese Laid-Open Publication No. 2009-075716
Patent document 3: Japanese Laid-Open Publication No. 2008-250945

SUMMARY

According to an aspect of the embodiments, a RAID group control device for performing access control over one or more RAID groups each having redundancy includes an acquiring unit to acquire access frequency information with respect to a RAID group among the one or more RAID groups; a scheduling unit to find a time period exhibiting a lower access frequency than access frequencies of anterior and posterior time periods in a specified time range on the basis of the access frequency information, and to determine start timing of a process of rewriting firmware of drives belonging to the RAID group on the basis of the found time period; and a firmware rewrite processing unit to start the process of rewriting the firmware of the drives at the determined start timing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of a configuration and an example of a manner of use of a disk array device according to a first embodiment of the present invention;

FIG. 3 is an explanatory diagram of an operation, in response to a read access, of an access save control unit in the disk array device according to the first embodiment.

FIG. 4B is an explanatory diagram of the operation of the access save control unit in response to the write access;

FIG. 6 is an explanatory diagram of access count information stored in a memory of the master CM;

FIG. 7 is an explanatory diagram of access history information stored in the memory of the master CM;

FIG. 8 is an explanatory diagram of contents of a process executed by an access rank adjusting unit in the disk array device according to the first embodiment;

FIG. 9 is an explanatory diagram of a rank table that is generated (updated) by the access rank adjusting unit;

FIG. 10 is a flowchart of a first FW application control process executed by a schedule control unit in the disk array device according to the first embodiment;

FIG. 11 is a flowchart of a working table generating and updating process executed during the first FW application control process;

FIG. 12A is an explanatory diagram of the working table;
FIG. 12B is an explanatory diagram of the working table;
FIG. 13 is a flowchart of a firmware application order list generating process executed during the first FW application control process;

FIG. 14 is an explanatory diagram of the working table.

FIG. 17B is an explanatory diagram of the operation, in response to the sequence designation firmware application start request depicted in FIG. 16B, of the firmware management control unit;

FIG. 18B is a flowchart (part 2) of the division FW application control process;

FIG. 18C is a flowchart (part 3) of the division FW application control process;

FIG. 18D is a flowchart (part 4) of the division FW application control process;

FIG. 18E is a flowchart (part 5) of the division FW application control process;

FIG. 18H is a flowchart (part 8) of the division FW application control process;

FIG. 18I is a flowchart (part 9) of the division FW application control process;

FIG. 19A is an explanatory diagram of a rank-A table used when at the division FW application control process;

FIG. 19B is an explanatory diagram of a rank-B table used when at the division FW application control process;

FIG. 19C is an explanatory diagram of a rank-C table used when at the division FW application control process;

FIG. 19D is an explanatory diagram of a rank-D table used when at the division FW application control process;

DESCRIPTION OF EMBODIMENTS

Figure 2A:
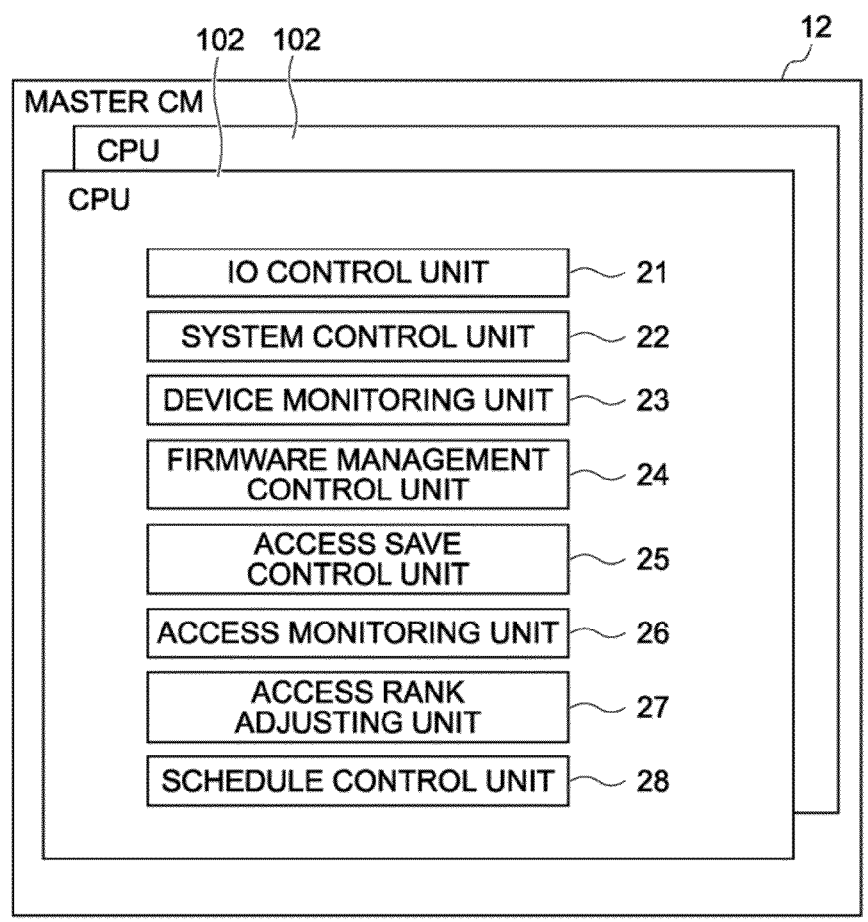
FIG. 2A is a functional block diagram of a master CM within the disk array device according to the first embodiment.

In-depth descriptions of embodiments of the present invention will hereinafter be made with reference to the drawings.

<<First Embodiment>>

FIG. 1 illustrates a configuration and a manner of use of a disk array device 10 according to a first embodiment of the present invention.

As depicted in FIG. 1, the disk array device 10 according to the first embodiment includes a controller enclosure (CE) 11 which accommodates a plurality of controller modules (CMs) 12, and a storage unit 16. The storage unit 16 includes a plurality of drive enclosures (DEs) 15 each accommodating a plurality of drives 150 (hard disk drives or SSDs (Solid State Drives)). Each DE 15 normally accommodates, together with the plurality of drives 150 for storing the data, a hot spare drive 155 used as a substitute for a failed drive 150.

Each CM 12 included in the disk array device 10 is a module which controls the storage unit 16 in response to a read/write request received from a host 40 via an FC (Fibre Channel) switch 30 (or received directly from the host 40).

As depicted in FIG. 1, each CM 12 includes two channel adaptors (CAs) 101 defined as interface modules with respect to the host 40 and two drive adaptors (DAs) 104 defined as interface modules with respect to the DEs 15. Further, each CM 12 includes a ROM (Read Only Memory; an illustration thereof is omitted), two CPUs (Central Processing Units) 102 which execute a variety of processes based on programs (firmware) stored in this ROM, and a memory 103 for temporarily storing a variety of data.

Each of the CMs 12 of the disk array device 10 according to the first embodiment deals with the storage unit 16 as a plurality of RAID groups having redundancy. Further, each CM 12 controls only some of the RAID groups that are previously assigned to the self-CM 12 as the groups about which the self-CM 12 should take charge of the control.

Moreover, a specified CM 12 within the disk array device 10 operates as a master CM 12 having a function different from those of other CMs 12 (which will hereinafter be also referred to as slave CMs 12).

Figure 2B:
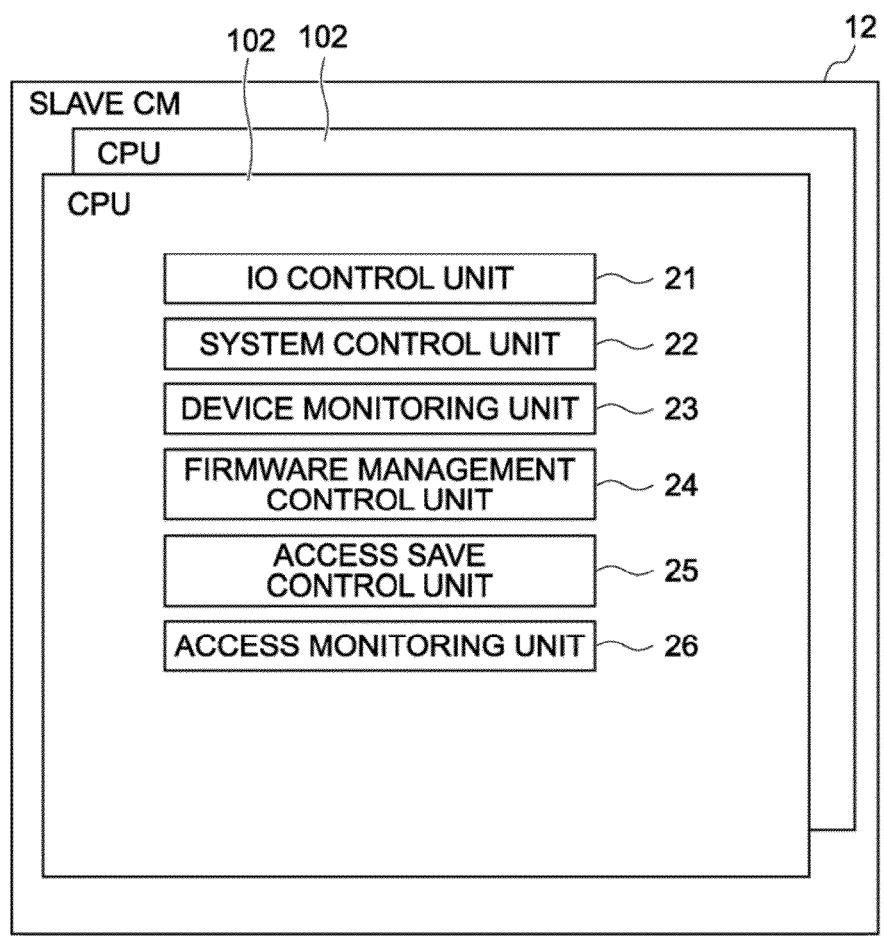
FIG. 2B is a functional block diagram of a slave CM within the disk array device according to the first embodiment.

FIGS. 2A and 2B depict functional block diagrams of the master CM 12 and the slave CM 12, respectively.

As depicted in FIG. 2A, the master CM 12 includes an IO (input-output) control unit 21, a system control unit 22, a device monitoring unit 23, a firmware management control unit 24, an access save control unit 25, an access monitoring unit 26, an access rank adjusting unit 27 and a schedule control unit 28. Further, as illustrated in FIG. 2B, the slave CM 12 includes the IO control unit 21, the system control unit 22, the device monitoring unit 23, the firmware management control unit 24, the access save control unit 25 and the access monitoring unit 26.

To be more specific, the slave CM 12 includes a CPU 102 functioning as the IO control unit 21, the system control unit 22, the device monitoring unit 23, the firmware management control unit 24, the access save control unit 25, and the access monitoring unit 26. Furthermore, the master CM 12 (FIG. 2A) includes a CPU 102 functioning as the IO control unit 21, the system control unit 22, the device monitoring unit 23, the firmware management control unit 24, the access save control unit 25, the access monitoring unit 26, the access rank adjusting unit 27, and the schedule control unit 28.

The IO control unit 21, the system control unit 22, and the device monitoring unit 23, which are included in each CM 12 (the master/slave CM 12), are the units (functional blocks) included also in the existing CM. Therefore detailed descriptions of the functions of the respective units are omitted, but the IO control unit 21 controls the I/O from the host device. Further, the system control unit 22 performs power control, configuration management, etc., and the device monitoring unit 23 monitors a device status (a status, etc. of each of the drives 150 within the storage unit 16).

The firmware management control unit 24, the access save control unit 25, the access monitoring unit 26, the access rank adjusting unit 27 and the schedule control unit 28 are the units which are not included in the existing CM.

The functions of the individual units will hereinafter be described in a specific manner. Note that "FW" represents the firmware, and "RAID-G" designates the RAID group in the following discussion.

[Firmware Management Control Unit]

The FW (firmware) management control unit 24 is a unit capable of executing a FW application process with respect to an arbitrary RAID group about which the self-CM 12 takes charge of the control . Herein, the FW application process connotes a process of sequentially executing "a process of storing other pieces of FW (firmware) in nonvolatile FW storage memories within the drive 150 and thereafter rebooting the drive 150" with respect to the individual drives 150 configuring the processing target RAID group.

Though the details will be described later on, the schedule control unit 28 of the master CM 12, if a predetermined condition is satisfied, transmits a FW application start request or a sequence designation FW application start request to the CM 12 (self/another CM 12) taking charge of the control over the RAID-G to which the FW should be applied.

The FW application start request is a request that contains identifying information (a RAID-G number in the first embodiment) of one or more RAID-Gs to which the FW should be applied (which will hereinafter be termed FW application target RAID-Gs).

The FW management control unit 24, when receiving the FW application start request, at first, performs communications with the device monitoring unit 23, thereby determining whether or not the FW application target RAID-Gs specified by the received FW application start request include any RAID-G with the redundancy being lost.

Then, the FW management control unit 24, if all of the FW application target RAID-Gs have the redundancy, starts the FW application process with respect to each of the FW application target RAID-Gs.

The FW management control unit 24, if the FW application target RAID-Gs includes the groups having the redundancy and the groups with the redundancy being lost, notifies the schedule control unit 28 of a purport saying that the FW application process for each of the FW application target RAID-Gs with the redundancy being lost is not executed. Thereafter, the FW management control unit 24 starts the FW application process with respect to each of the FW application target RAID-Gs that could be confirmed in terms of their having the redundancy.

Further, the FW management control unit 24, if all of the FW application target RAID-Gs have lost their redundancy, notifies the schedule control unit 28 of the purport that the FW application process with respect to the respective (whole) FW application target RAID-Gs is not implemented. Then, the FW management control unit 24 finishes, without starting the FW application process, the process in response to the received FW application start request.

Note that the FW management control unit 24 notifies, before starting the FW application process with respect to a certain FW application target RAID-G, the access save control unit 25 of the identifying information of this FW application target RAID-G. Furthermore, the FW management control unit 24 transmits, each time the FW application process for one drive 150 is completed, completion notifying information (which is information containing the identifying information of the drive 150 with FW update being completed in the first embodiment) representing this purport to the access save control unit 25. Then, the FW management control unit 24, when the access save control unit 25 receiving the completion notifying information notifies that a data writeback process (an in-depth description thereof will be made later on) is completed, starts the FW application process for the next drive 150.

Moreover, the FW management control unit 24, when completing the FW application process with respect to a certain FW application target RAID-G (when notified of the completion of the data write-back process with respect to the last drive 150), gives the notification of this purport to the schedule control unit 28 of the master CM 12.

Contents of the sequence designation FW application start request and an operation of the FW management control unit 24 in response to the sequence designation FW application start request, will be described later on together with an operation of the schedule control unit 28.

[Access Save Control Unit]

The access save control unit 25 is a unit which processes a read/write access (a read/write request) from the host 40 about the RAID group undergoing the FW application process. The access save control unit 25 grasps which RAID-G is an in-FW-application RAID group 200 from the identifying information (RAID-G number) of which the notification is given from the FW management control unit 24.

The operation of the access save control unit 25 will hereinafter be described on a status-by-status basis by use of FIGS. 3, 4A, 4B and 5. Note that in the respective drawings and the following discussion, the in-FW-application RAID group (or in-FW-application RAID-G) 200 connote the RAID group which is now undergoing the FW application process. Further, an in-FW-application drive 150A connotes the drive 150, to which the FW is actually being applied (the drive 150 undergoing the FW rewriting or rebooting), within the in-FW-application RAID group 200.

Explained at first by use of FIG. 3 is the operation of the access save control unit 25 in such a case that the read access (read request) to the in-FW-application RAID-G 200 occurs in a status where all of the drives 150 configuring the in-FW-application RAID-G 200 function normally.

In this case, the access save control unit 25, as schematically depicted in FIG. 3, reads the data requested for reading by the read access from the drives 150 other than the in-FW-application drive 150A, and sends the readout data back to the host 40.

When the FW management control unit 24 notifies of a plurality of RAID-G numbers (i.e., when there is a plurality of in-FW-application RAID-Gs 200), the access save control unit 25 executes the process having the contents described above about the read access to each in-FW-application RAID-G 200.

Figure 4A:
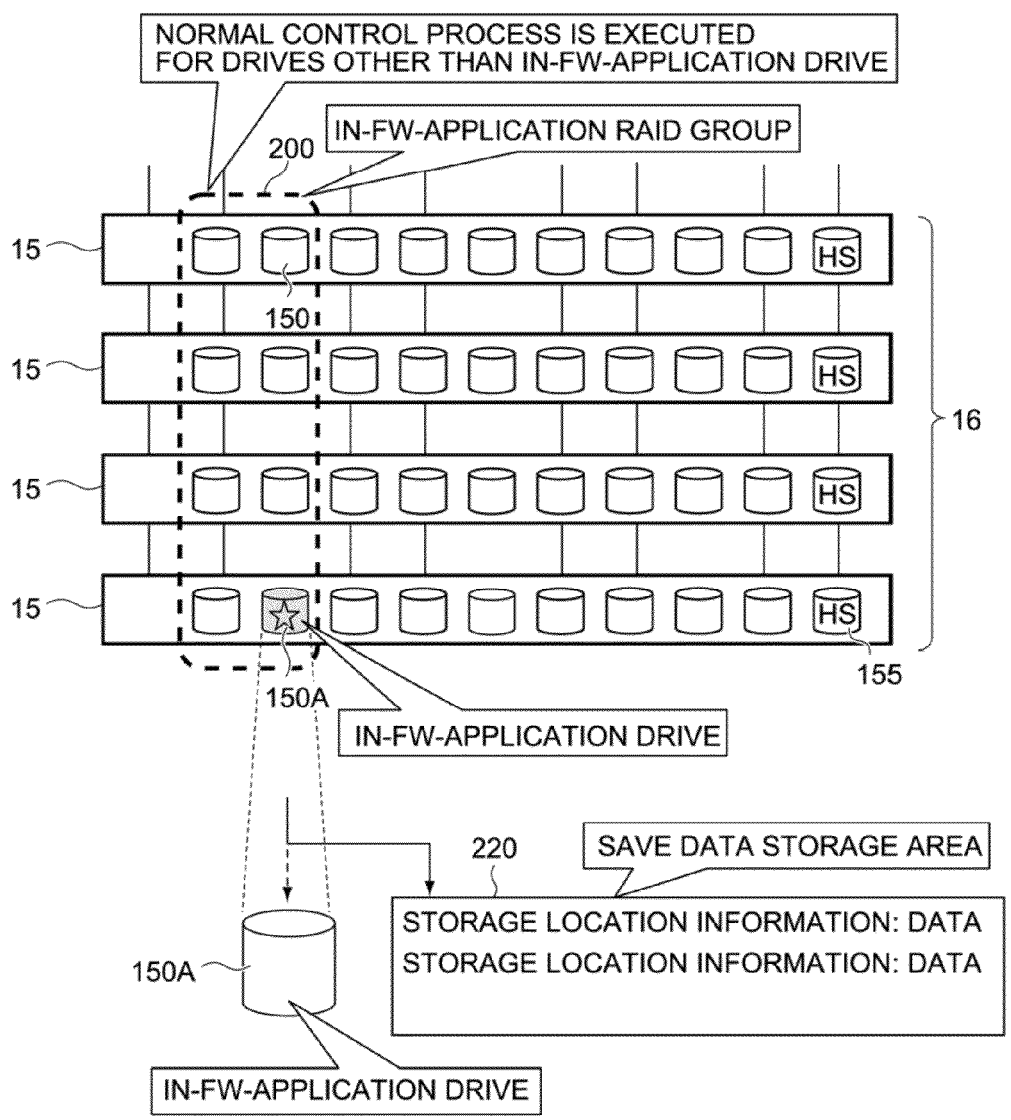
FIG. 4A is an explanatory diagram of an operation of the access save control unit in response to a write access.

Described next by use of FIGS. 4A and 4B is the operation of the access save control unit 25 in such a case that the write access (write request) to the in-FW-application RAID-G 200 occurs in the status where all of the drives 150 configuring the in-FW-application RAID-G function normally.

In this instance, the access save control unit 25, as schematically illustrated in FIG. 4A, executes the normal control process with respect to the drives 150 excluding the in-FW-application drive 150A. Herein, the normal control process connotes a process of writing, to the drives 150, the same items of data (pieces of data into which the write data are segmented, parity, etc.) as the data to be written in the case of not conducting the FW application process.

Further, in the case described above, the access save control unit 25 executes also a process of storing, in a save data storage area 220, the data that should be written to the in-FW-application drive 150A and storage location information, which contains a drive name of the in-FW-application drive 150A, indicating an original storage location of the data. Herein, the save data storage area 220 represents a storage area that is previously reserved in a specified hot spare drive 155 or on the memory 103 of the self-CM 12. A size of this save data storage area 220 is determined to enable storage of "information of such a quantity as to normally need saving during a period till the FW application process is completed in the case of executing the FW application process under a status of having a high access frequency."

Note that the access save control unit 25 uses a part of the save data storage area 220 as a storage location information storage area, and employs the remaining area of the save data storage area 220 as a data storage area. Furthermore, the access save control unit 25, when the write access to the in-FW-application RAID-G 200 occurs, stores the data that should be written to the in-FW-application drive 150A in the data storage area in the form of being continuous to the data stored in the data storage area last time. Further, the access save control unit 25 stores the fixed-length storage area location information containing a starting address and a size of the storage area of the data that should be written to the in-FW-application drive 150A in the storage location information storage area.

The access save control unit 25 processes the write access to the in-FW-application RAID group 200 in the manner described above till the FW application process for the in-FW-application drive 150A is completed.

The access save control unit 25 operates as below when receiving completion notification information on the in-FWapplication drive 150A from the FW management control unit 24. To begin with, the access save control unit 25, as depicted in FIG. 4B, executes the data write-back process of writing the respective items of data on the save data storage area 220 to the in-FW-application drive ("FW application completed drive" in FIG. 4B) 150A with the FW application process being completed. When this data write-back process executes, the access save control unit 25 recognizes a write-back destination of each item of data from the storage location information on the save data storage area 220.

Thereafter, the access save control unit 25 notifies the FW management control unit 24 that the data write-back process has been completed, and erases unnecessary items of data from on the save data storage area 220 (no figured). Then, the access save control unit 25 finishes the process with respect to the drive 150 (150A) to which the FW is applied this time.

It is to be noted that the access save control unit 25, if the save data storage area 220 reaches its full capacity before completing the FW application process, transitions to a status of not accepting the access to the in-FW-application RAID-G 200. Then, the access save control unit 25, when completing the FW application process, executes the data write-back process and thereafter returns to the status of accepting the access to the in-FW-application RAID-G 200.

The operation contents of the access save control unit 25 are the same also in the case of receiving the notification of the plurality of RAID-G numbers from the FW management control unit 24 (in such a case that the plurality of in-FW-application RAID-Gs 200 exists). To be specific, in the case of receiving the notification of the plurality of RAID-G numbers from the FW management control unit 24, the FW management control unit 24 stores, on the save data storage area 220, the data that should be written to the in-FW-application drive 150A of each in-FW-application RAID-G 200 and the storage location information related to this data. Then, the access save control unit 25, when completing the FW application process with respect to a certain in-FW-application drive 150A, executes the data write-back process of writing only the data associated with each piece of storage location information containing the drive name of this in-FW-application drive 150A back to the FW application completed drive 150A.

Figure 5:
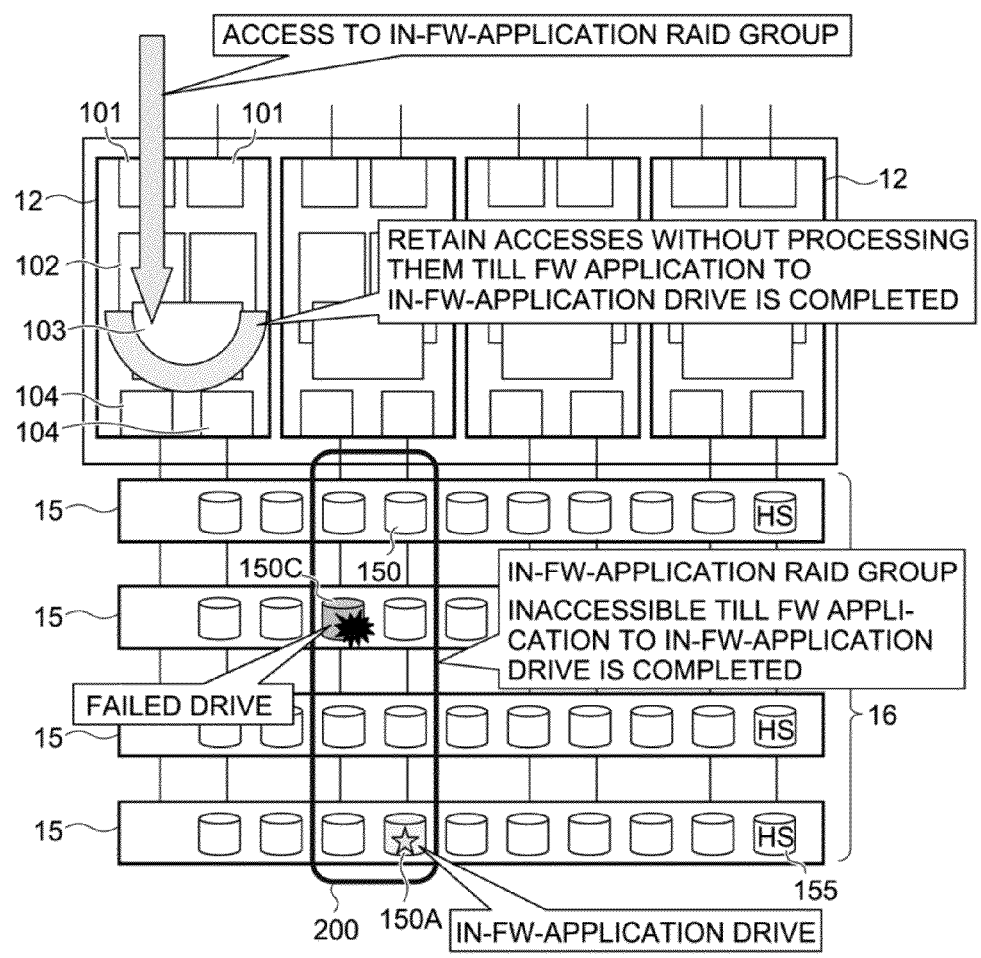
FIG. 5 is an explanatory diagram of an operation of the access save control unit in case where a non in-firmware-application drive fails.

Described next by use of FIG. 5 is an operation of the access save control unit 25 in a case where the read/write access to the in-FW-application RAID-G 200 is processed in the form described above, during which a non in-FW-application drive 150 of the in-FW-application RAID-G 200 breaks down.

If the non in-FW-application drive 150 breaks down, it follows that the in-FW-application RAID-G 200 at a normal RAID level functions as "the storage device which comes to an unusable status if the FW application to a certain drive 150 gets into a failure." Note that the normal RAID level connotes, though having the redundancy, a RAID level at which to disable the RAID from taking a measure (troubleshooting) against the breakdowns of the plurality of drives.

Therefore, the access save control unit 25 interrupts the FW application process of the FW management control unit 24 at a stage of completing the FW application process for the present in-FW-application drive 150A. Then, the FW management control unit 24 resumes the interrupted FW application process after the RAID-G has returned to the status of having the redundancy (after completing the process of making the hot spare drive 155 function as the drive 150 in place of a failed drive 150C).

Further, the access save control unit 25 operates in a status of retaining inside the access to the in-FW-application RAID-G 200 during the period till completing the FW application process with respect to the in-FW-application drive 150A, and processing each access after completing the FW application process with respect to the in-FW-application drive 150A. If the FW application process for the in-FW-application drive 150A is not completed within a fixed period of time after receiving a certain access (request), however, the access save control unit 25 discards the already-received access and transmits a retry request for the access to the host 40.

In short, the access save control unit 25, if a certain non in-FW-application drive 150 (150C) breaks down, operates in the status of not absolutely performing the access to the in-FW-application RAID-G 200 till the FW application to the in-FW-application drive 150A is completed.

Under the state of having received the notification of the plurality of RAID-G numbers from the FW management control unit 24, the access save control unit 25 operates likewise also if the non in-FW-application drives 150 in the two or more in-FW-application RAID-Gs 200 break down.

[Access Monitoring Unit]

On the memory 103 of each CM 12, reserved is an area for storing access count information on each RAID group about which the self-CM 12 takes charge of the control, and access history information. Herein, the access count information on a certain RAID-G connotes information containing an access count (access frequency) per unit time (e.g., 1 min) within a predetermined period in the past (e.g., up to the present point of time from 24 hours ago). This access count information is stored as access count information 50 taking a format as depicted in, e.g., FIG. 6 on the memory 103.

Further, the access history information on a certain RAID-G connotes information (details thereof will be stated later on) stored as access history information 55 taking a format as illustrated in, e.g., FIG. 7 on the memory 103.

The access monitoring unit 26 always monitors the access status to each RAID group about which the self-CM 12 is in charge of the control. Then, the access monitoring unit 26 updates at any time, on the basis of a result of monitoring the access status, the access count information 50 (FIG. 6) to each RAID-G on the memory 103 in a way that becomes information containing the access count per unit time within the predetermined period in the past.

Moreover, the access monitoring unit 26 periodically (e.g., at intervals of 24 hours) executes an access history information update process of updating, based on the access count information 50 about the same RAID-G, contents of the access history information 55 with respect to each RAID-G.

The access history information 55 is information containing an access count and an access rank for each of every specified period of time (30 min in the first embodiment) within, as illustrated in FIG. 7, the predetermined period of time (24 hours in the first embodiment) in the past. When executing the access history information update process, the access monitoring unit 26 obtains, based on the access count information 50 (FIG. 6) about each RAID-G, the access count in a time period during every specified period of time with respect to each RAID-G. In addition, the access monitoring unit 26 changes the access count of each time period in the access history information 55 about each RAID-G to an obtained value.

Further, when executing the access history information update process, the access monitoring unit 26 obtains the access rank (which will hereinafter be simply termed the rank) by the following algorithm from the access count during each time period, which is acquired with respect to each RAID-G. Then, the access monitoring unit 26 changes the rank within each time period in the access history information 55 with respect to each RAID-G to an obtained rank, and thereafter finishes the access history information update process.

Access count>A-B Boundary Access
Count→Rank=A

A-B Boundary Access Count≥Access Count>B-C
Boundary Access Count→Rank=B

B-C Boundary Access Count≥Access Count>C-D
Boundary Access Count→Rank=C

C-D Boundary Access Count≥Access
Count→Rank=D

Herein, the A-B boundary access count connotes a value that is set beforehand as a standard access count implying that approximately a 40% capacity of the save data storage area 220 is to be used during the FW application of each drive 150 (see FIGS. 4A and 4B). The B-C boundary access count connotes a value that is previously set as a standard access count implying that approximately a 20% capacity of the save data storage area 220 is to be employed during the FW application of each drive 150. The C-D boundary access count connotes a value that is set beforehand as a standard access count implying that almost no capacity of the save data storage area 220 is to be used (approximately a 1% capacity of the save data storage area 220 is to be employed) during the FW application of each drive 150.

[Access Rank Adjusting Unit]

As already explained, the access rank adjusting unit 27 is a unit (see FIGS. 2A and 2B) provided only in the master CM 12.

This access rank adjusting unit 27 is a unit which performs the process having the same contents for each CM 12 within the disk array device 10. Hence, the following discussion will deal with only the process conducted for a certain CM 12 (which includes the self-CM 12 and will hereinafter be referred to as a focused CM 12). In the following discussion, the FW management control unit 24 and the access monitoring unit 26 in the focused CM 12 are referred to as a focused FW management control unit 24 and a focused access monitoring unit 26.

The access rank adjusting unit 27, every time the focused access monitoring unit 26 completes updating the access history information 55 (FIG. 7), acquires the rank in each time period with respect to every RAID-G about which the focused CM 12 takes charge of the control. In other words, the access rank adjusting unit 27, whenever the focused access monitoring unit 26 updates the contents of the access history information 55 with respect to every RAID-G, acquires partial information in each set of access history information 55 with the contents being updated.

Then, the access rank adjusting unit 27 executes a rank updating process for updating (adjusting) the rank, which is acquired this time, in each time period with respect to every RAID-G into a rank exhibiting a higher possibility of matching with the actual access count when transitioning to each time period.

To be specific, when implementing the rank updating process, the access rank adjusting unit 27 compares every rank acquired this time (which will hereinafter be referred to as a calculated rank) with the processing result of the rank in the same time period, which was given by the rank updating process of the last time (which will hereinafter be referred to as a old rank). Then, the access rank adjusting unit 27, as depicted in FIG. 8, sets each calculated rank that matches the old rank or is different from the old rank by only one grade as a post-updated (adjusted) rank (which will hereinafter be termed an updated rank) as it is. Further, the access rank adjusting unit 27, as to each calculated rank that is different from the old rank by two or more grades (i.e., the calculated rank suspicious of existence of particular circumstances), specifies a rank that is different from the calculated rank by one grade towards the old rank, and sets the specified rank as the update rank.

With the rank updating process having the contents such as this, the access rank adjusting unit 27, which has obtained the updated rank for every time period with respect to each RAID-G, generates a rank table 60 having the contents as illustrated in FIG. 9 on the memory 103. Note that this rank table 60 is generated in the form of rewriting the pre-existing rank table 60 (the processing result of the rank updating process of the last time) on the memory 103.

In short, the access rank adjusting unit 27, every time the focused access monitoring unit 26 completes updating the access history information 55, acquires the rank for each time period with respect to each RAID-G about which the focused CM 12 takes charge of the control from the focused access monitoring unit 26. Then, the access rank adjusting unit 27 updates the acquired rank into a rank exhibiting the higher possibility of matching with the actual access count, and prepares the rank table 60 stored with the updated ranks for the respective time periods on a per RAID-G basis on the memory 103.

[Schedule Control Unit]

The schedule control unit 28 is, similarly to the access rank adjusting unit 27, a unit provided only in the master CM 12 (see FIGS. 2A and 2B).

This schedule control unit 28 is a unit which executes the process having the same contents about the individual rank table 60 (FIG. 9) prepared by the access rank adjusting unit 27 for every CM 12 on the memory 103. Therefore, the following discussion will deal with only the process performed by the schedule control unit 28 for the rank table 60 (which will hereinafter be referred to as a focused rank table 60) prepared by the access rank adjusting unit 27 with respect to a certain CM 12 (which will hereinafter be termed a focused CM 12). Further, in the following discussion, the RAID-G of which the ranks in the respective time periods (which is, i.e., the RAID-G about which the focused CM 12 takes charge of the control) are stored in the focused rank table 60 is also simply referred to as the RAID-G.

The schedule control unit 28 may execute first and second FW application control processes.

Each of the first and second FW application control processes is a process of determining, based on the information of the focused rank table 60, the time when the FW application process to every RAID-G should be started, and starting the FW application process to each RAID-G at the determined time. Further, each of these FW application control processes is a process executed by the schedule control unit 28 when the user gives an instruction that a certain piece of FW (firmware) should be applied to each RAID-G within a certain range of continuous time.

The schedule control unit 28 executes the first FW application control processes if the user specifies a time range including a plurality of continuous rank calculation target time periods as the time period in which the FW should be applied (which will hereinafter be referred to a specified time range). Note that the rank calculation target time period connotes a time period in which to determine the access rank (see FIG. 7; the time period is delimited by a time length of 30 min).

Moreover, the schedule control unit 28, if the user specifies a single rank calculation target time period as the specified time range, executes the second FW application control process.

Discussed at first are contents of the first FW application control process executed by the schedule control unit 28 if the specified time range is a time range including a plurality of continuous rank calculation target time periods.

FIG. 10 illustrates a flowchart of the first FW application control process.

As illustrated in FIG. 10, the schedule control unit 28, which has started the first FW application control process, executes, to begin with, a working table generating and updating process (step S101).

The working table generating and updating process is a process containing procedures depicted in FIG. 11. Namely, the schedule control unit 28 starting the working table generating and updating process performs at first a process of generating a working table 70 on the memory 103 on the basis of the focused rank table 60 (step S201).

FIG. 12A depicts an example of the working table 70 generated on the memory 103 by the process in step S102. Note that the working table 70 illustrated in FIG. 12A is a table generated on the memory 103 when the focused rank table 60 is the table having the contents illustrated in FIG. 9.

As apparent from FIGS. 12A and 9, the working table 70 is the table which retains the same items of information as those of the focused rank table 60. The working table 70 has, however, additions of fields for storing status information ("not-yet-determined" in FIG. 12A) on the respective RAID-Gs and fields for storing working flags ("work-F") about the individual time periods of the RAID-Gs.

The status information stored in this working table 70 is information indicating whether or not the FW application time of the corresponding RAID-G has already been determined. The working flag is defined as binary information used for determining the FW application time of each RAID-G. As depicted in FIG. 12A, by the process of step S201, generated is the working table 70 where the information "not-yet-determined" representing that the FW application time of the corresponding RAID-G is not yet determined is set as each piece of status information, and a value "0" is set as each working flag.

Referring back to FIG. 11, the description of the working table generating and updating process continues.

The schedule control unit 28, which has generated the working table 70, selects the RAID-G set as a processing target (which will hereinafter be termed the target RAID-G) from within the RAID-Gs of which the identifying information is stored on the working table 70 (step S202).

Subsequently, the schedule control unit 28 specifies, based on the information of the working table 70, a time period exhibiting the lowest rank with respect to the target RAID-G from within the time periods in the specified time range (step S203). Thereafter, the schedule control unit 28 changes the working flag about the specified time period with respect to the target RAID-G on the working table 70 to "1" (step S204).

The schedule control unit 28 finishing the process in step S204 determines whether or not the processes for all of the RAID-Gs of which the identifying information is stored on the working table 70 (step S205). If there remains the RAID-G with the process being not yet completed (step S205; NO), the schedule control unit 28, after changing the target RAID-G to the next RAID-G (step S206), executes again the processes from step S203 onward.

Then, the schedule control unit 28, when completing the processes for all of the RAID-Gs of which the identifying information is stored on the working table 70 (step S205; YES), finishes the working table generating and updating process.

Herein, the contents of the working table generating and updating process are to be described more specifically by exemplifying a case in which the specified time range is "00:00:00-02:00:00" and the focused rank table 60 is the table having the contents illustrated in FIG. 9.

In the case described above, the working table generating and updating process involves, at first, generating the working table 70 having the contents illustrated in FIG. 12A on the memory 103.

Thereafter, the processes in steps S203 and S204 are executed for each RAID group. Hence, the time periods "00:30:00-01:00:00" and "01:00:00-01:30:00", which are lowest in rank in the specified time range, are specified with respect to the RAID group 1, and the values of the working flags thereof are changed to "1." Further, the time periods "01:00:00-01:30:00" and "01:30:00-02:00:00", which are lowest in rank in the specified time range, are specified with respect to the RAID group 4, and the values of the working flags thereof are changed to "1."

Moreover, the same rank is given to the time periods in the specified time range with respect to the RAID groups 2 and 3. Namely, the ranks of the time periods in the specified time range with respect to the RAID groups 2 and 3 are all the lowest ranks. Therefore, the values of the working flags about the respective time periods within the specified time range with respect to the RAID groups 2 and 3 are all changed to "1."

If the specified time range is "00:00:00-02:00:00" and the focused rank table 60 is the table having the contents illustrated in FIG. 9, the processes described above are carried out. Accordingly, upon completing the working table generating and updating process, such a status is generated that the working table 70 having the contents depicted in FIG. 12B exists on the memory 103.

When completing the working table generating and updating process (FIG. 10; step S101), the schedule control unit 28 executes, at subsequent step S102, a FW application order list generating process in procedures illustrated in FIG. 13.

That is, the schedule control unit 28, which has started the FW application order list generating process, at first initializes the FW application order list into an empty list (step S300). Subsequently, the schedule control unit 28 selects the first time period in the specified time range as a target time period (step S301).

Thereafter, the schedule control unit 28 executes a process of specifying each RAID-G satisfying a condition that the working flag related to the target time period on the working table 70 is "1" and the status information on the working table 70 is "not-yet-determined" (step S302).

If absolutely unable to specify the RAID-G satisfying the condition given above (step S303; NO), the schedule control unit 28 determines whether the processes for all of the time periods in the specified time range are completed or not (step S308). Then, the schedule control unit 28, if a not-yet-processed time period remains (step S308; YES), changes the target time period to the next time period (step S309), and thereafter executes again the processes from step S302 onward.

Whereas if able to specify one or more RAID-Gs each satisfying the condition given above (step S303; YES), the schedule control unit 28 determines whether the number of the specified RAID-Gs (which will hereinafter be simply referred to as the specified number) is "1" or not (step S304).

If the specified number is "1" (step S304; YES), the schedule control unit 28 adds the FW application target information containing the RAID-G number of the specified RAID-G and the target time period to the FW application order list (step S305). Subsequently, the schedule control unit 28 changes the status information on the working table 70, which is for the RAID-G about which the FW application target information is added to the FW application order list, to "already-determined" (step S306).

Thereafter, the schedule control unit 28 determines whether or not there remains the "not-yet-determined" RAID-G (the RAID-G on which the status information is "not-yet-determined") (step S307). Then, the schedule control unit 28, if the "not-yet-determined" RAID-G remains (step S307; YES), starts the processes from step S308 onward.

If two or more RAID-Gs with "1" being set in their working flags are specified (step S304; NO), the schedule control unit 28 determines whether or not the FW (firmware) may be simultaneously applied to the specified plurality of RAID-Gs (step S311).

More specifically, the schedule control unit 28 determines whether or not the FW may be simultaneously applied to the specified plurality of RAID-Gs on the basis of a determination as to whether the following inequality for determination holds or not.

$$NA + NB \cdot \tfrac{1}{2} + NC \cdot \tfrac{1}{4} \leq 1$$

Note that NA, NB and NC represent the numbers of RAID-Gs, included in the plurality of RAID-Gs set as the determination target groups as to whether the FW may be simultaneously applied, of which ranks for the target time period are A, B and C, respectively.

Elucidated herein is a reason why the above-mentioned inequality enables the determination as to whether or not the FW may be simultaneously applied to the plurality of specified RAID-Gs.

As already described, the FW management control unit 24 may simultaneously execute the FW application processes with respect to a plurality of RAID-Gs. If the save data storage area 220 reaches its full capacity as a result of having a large quantity of write accesses during the FW application process, however, it follows that the FW management control unit 24 transitions to a status of not accepting the access to the RAID-G 200 during each FW application process.

For not causing such a state, a data quantity (which will hereinafter be referred to as a save data quantity) of the data stored in the save data storage area 220 during the FW application process is estimated for every RAID-G, and the number and a combination of the RAID-Gs to which FW is simultaneously applied may be determined so that a total sum of the data quantities becomes equal to or smaller than a size of the save data storage area.

Then, the ranks (access ranks) obtained by the aforesaid algorithm ("A-B boundary access count≥access count>B-C boundary access count→rank=B", etc.) are defined as pieces of information representing the following.

Rank=A: the maximum save data quantity is equal to or larger than ½ of the size of the save data storage area 220 or equal to or smaller than the size of the save data storage area.
Rank=B: the maximum save data quantity is approximately ½ (40%) of the size of the save data storage area 220.
Rank=C: the maximum save data quantity is approximately ¼ (20%) of the size of the save data storage area 220.
Rank=D: the maximum save data quantity is approximately "0."

It therefore follows that the inequality for determination enables the determination as to whether or not there is almost no possibility that the save data storage area 220 reaches its full capacity while the FW is applied simultaneously to each of the plurality of RAID-Gs (i.e., the FW may be simultaneously applied thereto).

If the FW may be simultaneously applied to the specified plurality of RAID-Gs (step S311; YES), the schedule control unit 28 adds, to the FW application order list, the FW application target information containing the RAID-G numbers of the specified RAID-Gs and the target time period (step S305). Note that the schedule control unit 28 executes also a process of storing the target time period as an allocation completed time period (its purpose will be described later on) in this step S305.

Subsequently, the schedule control unit 28 changes, to "already-determined", the status information in the working table 70 with respect to each RAID-G of which the FW application target information is added to the FW application order list (step S306). In additional, the schedule control unit 28 starts the processes from step S307 onward.

Whereas if the FW may not be simultaneously applied to the specified plurality of RAID-Gs (step S311; NO), the schedule control unit 28 selects such a number of RAID-Gs as to enable the FW to be simultaneously applied from the specified RAID-Gs in ascending order of their ranks for the target time period (step S312).

Subsequently, the schedule control unit 28 adds, to the FW application order list, the FW application target information containing the RAID-G numbers of the selected RAID-Gs and the target time period (step S313). The schedule control unit 28 executes also a process of storing the target time period as an allocation completed time period in this step S313.

Thereafter, the schedule control unit 28 starts the processes from step S306 onward.

These processes are repeated, during which, normally when completing the process in the time period designated by some which number within the specified time range, the "not-yet-determined" RAID-G disappears (step S307; NO) and hence the schedule control unit 28 finishes this FW application order list generating process.

Even when completing the process for the last time period within the specified time range, however, there may be a case in which the "not-yet-determined" RAID-G still remains (step S307; YES, step S308; NO). For example, the specified time range is "00:00:00-02:00:00", and, when completing the working table generating and updating process, the working table 70 has the contents illustrated in FIG. 14, in which case even when completing the process in the last time period within the specified time range, it follows that the "not-yet-determined" RAID-G still remains.

In such a case (step S308; NO), the schedule control unit 28 changes, to "1", the value "0" being set in the working flag related to the time period exhibiting the lowest rank in the specified time range with respect to the "not-yet-determined" RAID-G on the working table 70 (step S315). Then, the schedule control unit 28 executes the processes from step S301 onward in the form of being targeted at only each of the time periods not being the allocation completed time periods within the specified time range.

Referring back to FIG. 10, an operation of the schedule control unit 28 after completing the FW application order list generating process will be described.

As obvious from the contents of the respective processes explained so far, the specified time range is "00:00:00-02:00:00", and the rank table 60 has the contents illustrated in FIG.

8, in which case it follows that the FW application order list having the following contents is generated by the FW application order list generating process.

[2: "00:00:00-00:30:00"]
[3: "00:00:00-00:30:00"]
[1: "00:30:00-01:00:00"]
[4: "01:00:00-01:30:00"]

The schedule control unit 28 finishing the FW application order list generating process comes to a status of iterating the determination in step S103 and the process in step S106. To be specific, the schedule control unit 28 comes to a status of monitoring a point of reaching a start time of the time period in any one set of FW application target information on the FW application order list (which will hereinafter be referred to as a FW application process execution time).

When reaching the FW application process execution time (step S103; YES), the schedule control unit 28 transmits, to the focused CM 12, a FW application start request containing the RAID-G number of each RAID-G to which the FW should start being applied in the FW application process executing time (step S104).

Thereafter, the schedule control unit 28 determines whether the RAID-G to which a FW application start request is not yet transmitted remains or not (step S105).

If the RAID-G to which a FW application start request is not yet transmitted remains (step S105; YES), the schedule control unit 28 starts the processes from step S106 onward.

Then, the schedule control unit 28, when the RAID-G to which a FW application start request is not yet transmitted disappears (step S105; NO), terminates the first FW application control process.

Contents of a second FW application control process, contents of the FW application start request and an operation of the FW management control unit 24 in response to this request, will hereinafter be described.

Figure 15:
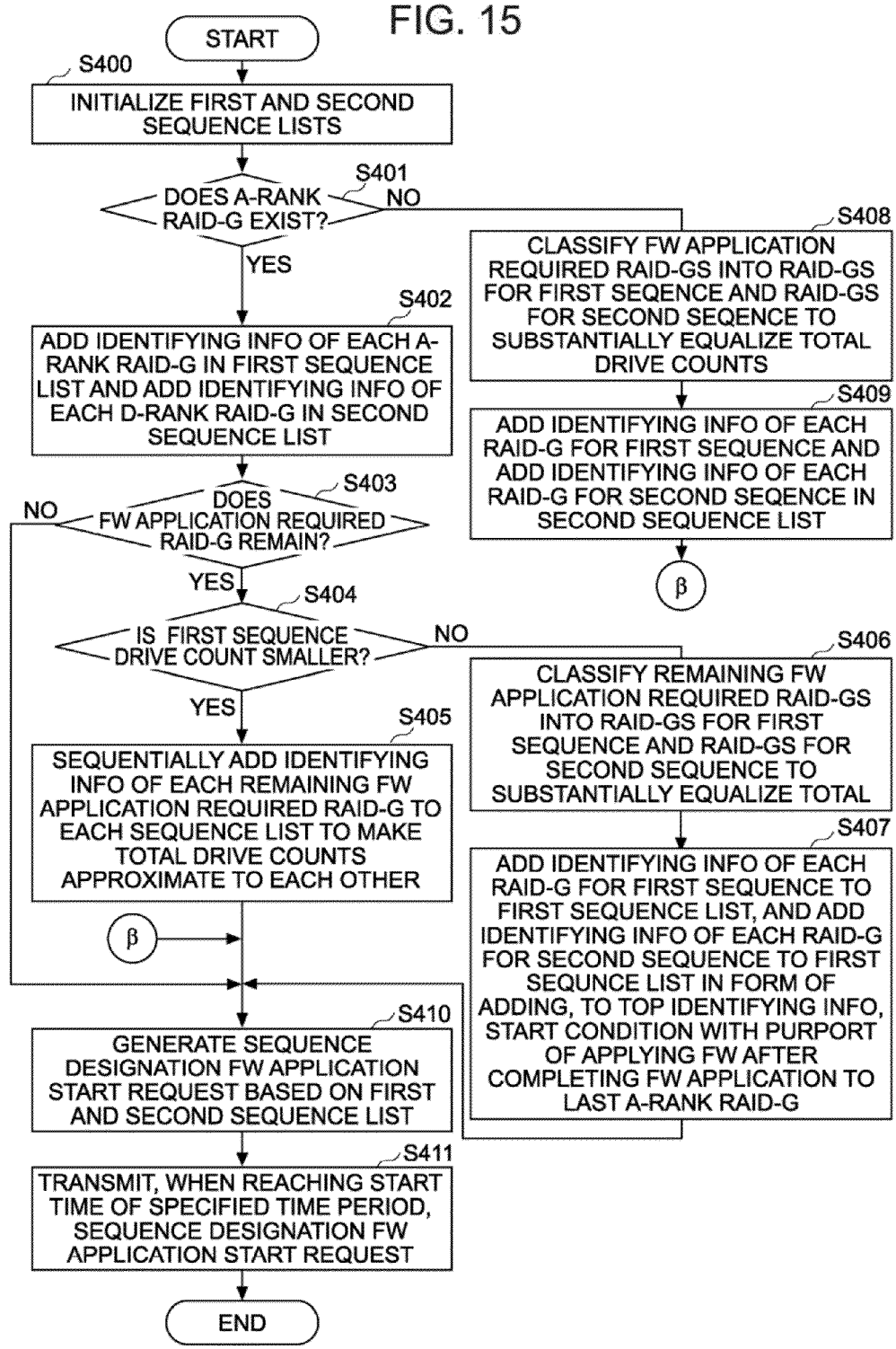
FIG. 15 is a flowchart of a second FW application control process executed by the schedule control unit.

FIG. 15 depicts a flowchart of the second FW application control process. Note that the second FW application control process is, as already explained, the process executed by the schedule control unit 28 if the specified time range is a single rank calculation target time period.

Described at first are the contents of the sequence designation FW application start request generated when at the process in step S410 of the second FW application control process and the operation of the FW management control unit 24 in response to this request.

Figure 16A:
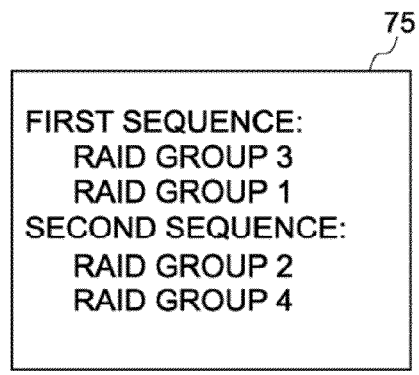
FIG. 16A is an explanatory diagram of a sequence designation firmware application start request generated when at the second FW application control process.
Figure 16B:
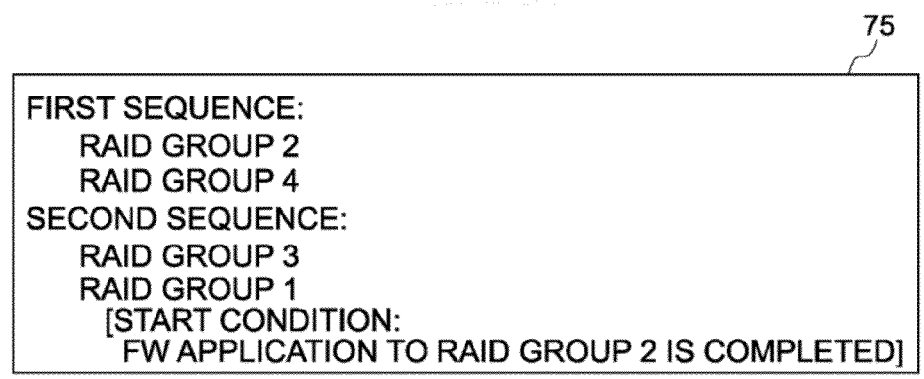
FIG. 16B is an explanatory diagram of the sequence designation firmware application start request generated when at the second FW application control process and containing setting of a start condition.

FIGS. 16A and 16B depict explanatory diagrams of a sequence designation FW application start request 75.

As illustrated in FIG. 16A, the sequence designation FW application start request 75 is basically a request containing first sequence information defined as a list of identifying information of several RAID-Gs to which the FW should be applied, and second sequence information defined as a list of identifying information of several RAID-Gs to which the FW should be applied. However, the sequence designation FW application start request 75 is, as depicted in FIG. 16B, a request having a format where, to the identifying information of the arbitrary RAID-G on the second sequence, a FW application start condition with respect to the RAID-G may be set.

On the other hand, the FW management control unit 24, when receiving the sequence designation FW application start request 75, starts the first sequence control process of applying the FW to the respective RAID-Gs designated to undergo the FW application in the first sequence information contained in the request 75 in the order specified in the first sequence information. Further, the FW management control unit 24 starts also the second sequence control process of applying the FW to the respective RAID-Gs designated to undergo the FW application in the second sequence information contained in the received sequence designation FW application start request in the order specified in the second sequence information. In the second sequence control process, however, the FW management control unit 24 starts applying the FW to the respective RAID-Gs designated to undergo the FW application in a start condition in the second sequence designation information after the start condition has been satisfied.

Figure 17A:
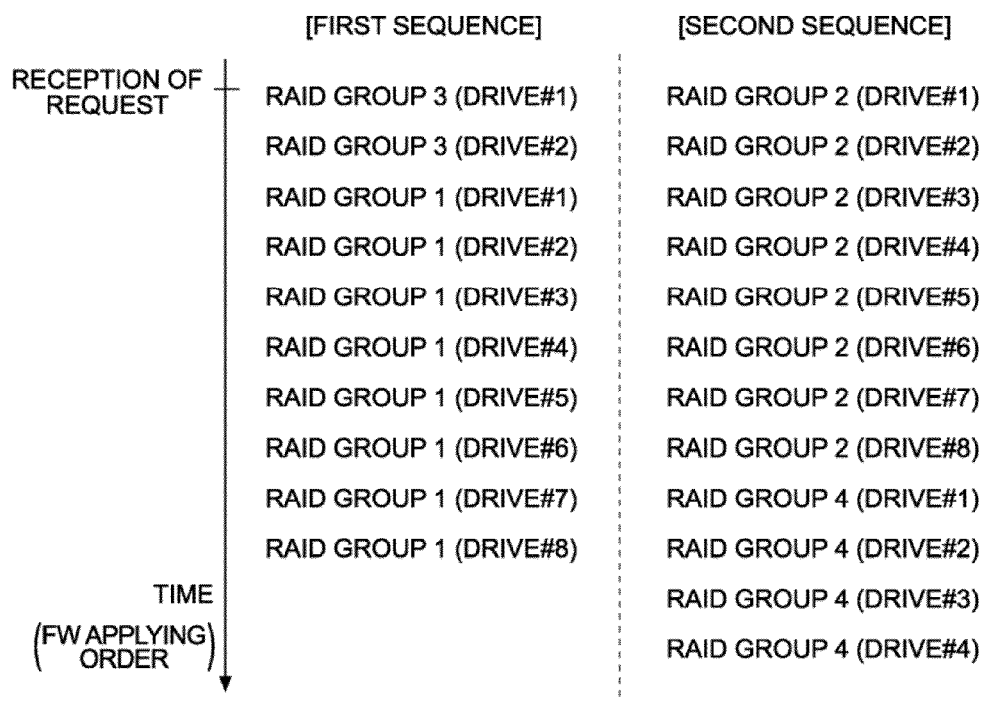
FIG. 17A is an explanatory diagram of an operation, in response to the sequence designation firmware application start request depicted in FIG. 16A, of a firmware management control unit in the disk array device according to the first embodiment.

In short, the FW management control unit 24, when receiving the sequence designation FW application start request 75 having the contents depicted in FIG. 16A, applies the FW to the respective drives 150 within the RAID groups 1-4 in the order as illustrated in FIG. 17A. Moreover, the FW management control unit 24, when receiving the sequence designation FW application start request 75 having the contents illustrated in FIG. 16B, applies the FW to the respective drives 150 within the RAID groups 1-4 in the order and at the timing as depicted in FIG. 17B.

Referring back to FIG. 15, the contents of the second FW application control process will be described.

The specified time range is a single rank calculation target time period (which will hereinafter be termed the specified time period), and hence the schedule control unit 28 starting the second FW application control process, to begin with, initializes the first sequence list and the second sequence list (step S400). The first and second sequence lists are lists (storage areas on the memory 103) used for preparing the first and second sequence information, respectively. In the process of step S400, each sequence list is initialized into an empty list (a list which is stored with none of significant information).

The schedule control unit 28, which has finished initializing the first and second sequence lists, determines whether an A-rank RAID-G exists or not (step S401). Herein, the A-rank RAID-G connotes the RAID-G of which the rank for the specified time period on the focused rank table 60 (see FIG. 9) is "A". The RAID-G of which the rank for the specified time period on the focused rank table 60 is "X" (X=B through D) will hereinafter be similarly expressed such as an X-rank RAID-G. Further, the RAID-G, the identifying information of which is already registered (stored) in the focused rank table 60 but is not yet registered in the sequence list, is referred to as a FW application required RAID-G.

If the A-rank RAID-G exists (step S401; YES), the schedule control unit 28 performs, in step S402, a process of registering (storing) the identifying information (the RAID-G number in the first embodiment) of each A-rank RAID-G in the first sequence list. Furthermore, the schedule control unit also performs a process of registering (storing) the identifying information of each D-rank RAID-G in the second sequence list in step S402. Note that this process is a process of doing nothing for the second sequence list if the D-rank RAID-G does not exist.

The schedule control unit 28 finishing the process in step S402 determines whether the FW application required RAID-G remains or not (step S403).

Then, the schedule control unit 28, if the FW application required RAID-G remains (step S403; YES), determines whether or not the number of drives of the first sequence is smaller than the number of drives of the second sequence (step S404). Herein, the number of drives of the Yth sequence (Y=1, 2) is a total number of the drives configuring the respective RAID-Gs of which the identifying information is registered in the Yth sequence list at that point.

If the number of drives of the first sequence is smaller than that of the other (step S404; YES), the schedule control unit 28 adds the pieces of identifying information of the remaining FW application required RAID-Gs to the respective sequence lists so as to get the number of drives of the respective sequences approximate to each other (step S405).

Namely, the process of step S405 is executed in the case where step S402 has been executed because of the existence of the A-rank RAID-G. Accordingly, it follows that the FW application required RAID-G remaining when at the process of step S405 is the B-rank RAID-G or the C-rank RAID-G. Further, if "the number of drives in the first sequence<the number of drives in the second sequence" holds, though the FW application for the first sequence is completed earlier than the other, the RAID-Gs belonging to the second sequence at the point of time when executing the process of step S405 are all the D-rank RAID-Gs. Therefore, even when whichever remaining FW application required RAID-G is registered in either of sequence lists, it follows that the two RAID-Gs, which simultaneously become the FW application target groups after completing the FW application to the first sequence (A-rank RAID-G), are limited to the two RAID-Gs with their ranks being equal to or lower than the B rank (i.e., the two RAID-Gs not causing the save data storage area 220 to reach the full capacity before completing the FW application even by simultaneously applying the FW).

Furthermore, the FW application to all of the drives 150 is completed sooner by setting the number of drives of the two sequences approximate to each other. Therefore, the identifying information of each remaining FW application required RAID-G is added to each sequence list in a way that gets the number of drives of the respective sequence approximate to each other.

The schedule control unit 28 finishing the process of step S405 performs a process of generating the sequence designation FW application start request 75 on the basis of the first and second sequence list at that point of time (step S410). Note that the specified time range is "01:00:00-01:30:00", the focused rank table 60 is the table illustrated in FIG. 9, and the number of the drives configuring the RAID-G1 through RAID-G4 are 8, 8, 2 and 4 respectively, in which case it follows that the sequence designation FW application start request 75 depicted in FIG. 16A is generated by the process at this step S410.

The schedule control unit 28 finishing the process of step S410 transmits, when reaching the start time of the specified time range, the sequence designation FW application start request 75 to the focused CM 12 (step S411). Then, the schedule control unit 28 terminates the second FW application control process.

Whereas if a relationship such as "the number of drives in the first sequence≥the number of drives in the second sequence" is established (step S404; NO), the schedule control unit 28 classifies the remaining FW application required RAID-Gs into the RAID-Gs for the first sequence and the RAID-Gs for the second sequence so that the total number of drives thereof are substantially equalized (step S406). In subsequent step S407, the schedule control unit 28 executes a process of adding the pieces of identifying information of the respective RAID-Gs for the first sequence to the first sequence list. Further, the schedule control unit 28 executes also a process of adding the identifying information of the respective RAID-Gs for the second sequence to the second sequence list in the form of adding, to its top identifying information, a start condition with a purport of applying the FW after completing the FW application to the last A-rank RAID-G.

Thereafter, the schedule control unit 28 generates, on the basis of the first and second sequence lists, the sequence designation FW application start request 75 (see FIG. 16B) (step S410). Then, the schedule control unit 28, when reaching the start time of the specified time range, transmits the sequence designation FW application start request 75 to the focused CM (step S411), and thereafter terminates the second FW application control process.

To summarize, at the point of time when making the determination in step S404, the RAID-Gs belonging to the first sequence and the second sequence are only the A-rank RAID-Gs and the D-rank RAID-Gs, respectively (refer to step S402). Therefore, if the relationship "the number of drives in the first sequence≥the number of drives in the second sequence" is established and if the FW starts being simultaneously applied to these two sequence, it follows that the FW application to the second sequence (the D-rank RAID-Gs) is completed before completing the FW application to the first sequence (the A-rank RAID-Gs). Furthermore, none of the D-rank RAID-G to which the FW may be applied simultaneously with the A-rank RAID-G is left in the FW application required RAID-Gs (refer to step S402). Hence, a scheme is that the FW is prevented from being applied to other B- and C-rank RAID-Gs simultaneously with the A-rank RAID-G by adding the identifying information of the FW application required RAID-Gs to the second sequence list in the form of adding the start condition.

If the A-rank RAID-G does not exist (step S401; NO), the schedule control unit 28 classifies all of the FW application required RAID-Gs into the RAID-Gs for the first sequence and the RAID-Gs for the second sequence so that the total number of drives thereof are substantially equalized (step S408). Subsequently, the schedule control unit 28 executes a process of adding the identifying information of the respective RAID-Gs for the first sequence to the first sequence list and adding the identifying information of the respective RAID-Gs for the second sequence to the second sequence list (step S409).

Then, the schedule control unit 28 generates, on the basis of the first and second sequence lists, the sequence designation FW application start request 75 (see FIG. 16A) (step S410). Then, the schedule control unit 28, when reaching the start time of the specified time range, transmits the sequence designation FW application start request to the focused CM (step S411), and thereafter terminates the second FW application control process.

Namely, the non-existence of the A-rank RAID-G (step S401; NO) implies that each FW application required RAID-G is any one of the B-rank RAID-G through D-rank RAID-G. And, even when the FW is simultaneously applied to the two RAID-Gs with their ranks being lower than the B rank, the save data storage area 220 does not reach in principle the full capacity before completing the FW application. Further, the FW application to all of the drives 150 is completed sooner by setting the number of drives of the respective sequence approximate to each other. Therefore, as described above, the respective FW application required RAID-Gs are allocated to the first and second sequence lists, thereby generating and transmitting the sequence designation FW application start request 75.

Note that the schedule control unit 28, though a description into the flowchart (FIG. 15) is omitted, determines whether or not it takes 30 min (i.e., a length of the specified time range) or longer to complete making the generated sequence designation FW application start request 75 on the basis of the number of drives of the respective sequence before executing the process of step S411. Then, the schedule control unit 28, if it takes 30 min or longer to complete making the generated sequence designation FW application start request 75, notifies the user of this purport without implementing the process of step S411, and thereafter finishes the second FW application control process.

As explained in detail so far, the CE 11 (and the master CM 12) of the disk array device 10 according to the first embodiment has the function of acquiring the access frequency information about a RAID group, then finding a time period exhibiting the lower access frequency than the access frequencies of time periods anterior and posterior to the time period in the specified time range on the basis of the acquired access frequency information, determining the start timing of the firmware rewriting process for the drives 150 belonging to the RAID group on the basis of the found time period, and starting the firmware rewriting process for the drives 150 at the determined start timing.

Then, if a trouble (a breakdown of the drive 150) occurs in the RAID-G during the FW application, generally the data are lost, and a probability of causing the trouble in the RAID-G increases as the access frequency rises. Hence, the CE 11 (or the master CM 12) according to the first embodiment, which finds (predicts) the time period with the access frequency being lower than those of the anterior and posterior time periods and updates the FW of the drives 150 of the RAID-G in the time period, may be said to be the device capable of rewriting safely the FW of the drives 150 configuring the RAID-Gs having the redundancy.

Further, the CE 11 (or the master CM 12) has the function of simultaneously, if possible, applying the FW to the two or more RAID-Gs. Therefore, the CE 11 (or the master CM 12) according to the first embodiment may complete the FW application to the plurality of RAID groups in a short period of time.

<<Second Embodiment>>

A disk array device according to a second embodiment of the present invention is a device into which the disk array device 10 according to the first embodiment is modified so that the schedule control unit 28 executes a division FW application control process which involves procedures illustrated in FIGS. 18A through 18I in place of the second FW application control process. Therefore, the following discussion will deal with operations of the disk array device 10 according to the second embodiment in a way that puts a focus on operations related to the division FW application control process by use of the same reference numerals and symbols as those employed for describing the disk array device 10 in the first embodiment.

As stated above, the division FW application control process is a process executed as a substitute for the second FW application control process. To be specific, the schedule control unit 28, if instructed to apply the FW in the form of specifying the single rank calculation target time period, executes the division FW application control process (FIGS. 18A through 18I).

This division FW application control process is also, similarly to the second FW application control process, a process of finding the time period with the access frequency being relatively low with respect to each RAID-G on the basis of the access history information 55, and controlling the respective units to apply the FW to each RAID-G in the thus-found time period. The division FW application control process is, however, a process of dividing the specified time period (which is the specified time range and is also the single rank calculation target time period specified by the user) into a first half period and a second half period and determining the section suited to the FW application per RAID-G.

Namely, as apparent from the processing contents that have already been described, the second FW application control process is that the FW application timing of each RAID-G is determined based on the assumption that the access frequencies at the respective points of time within the specified time range are the same. By contrast, the division FW application control process is a process of halving the specified time range into the first half period and the second half period and, after estimating the access frequencies of the two half periods from the access history information 55, determining the half period suited to the FW application per RAID-G.

Figure 18A:
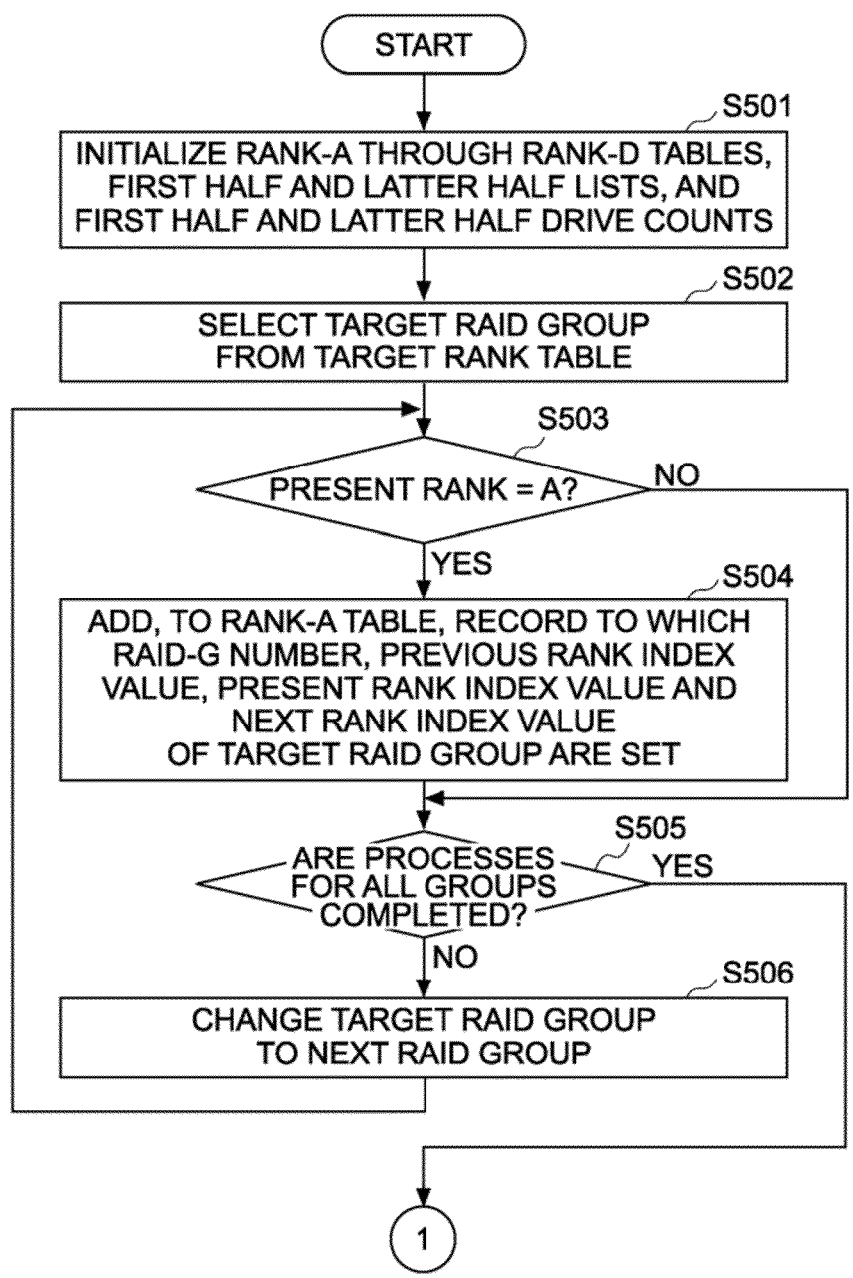
FIG. 18A is a flowchart (part 1) of a division FW application control process executed by the schedule control unit in the disk array device according to a second embodiment.
Figure 18F:
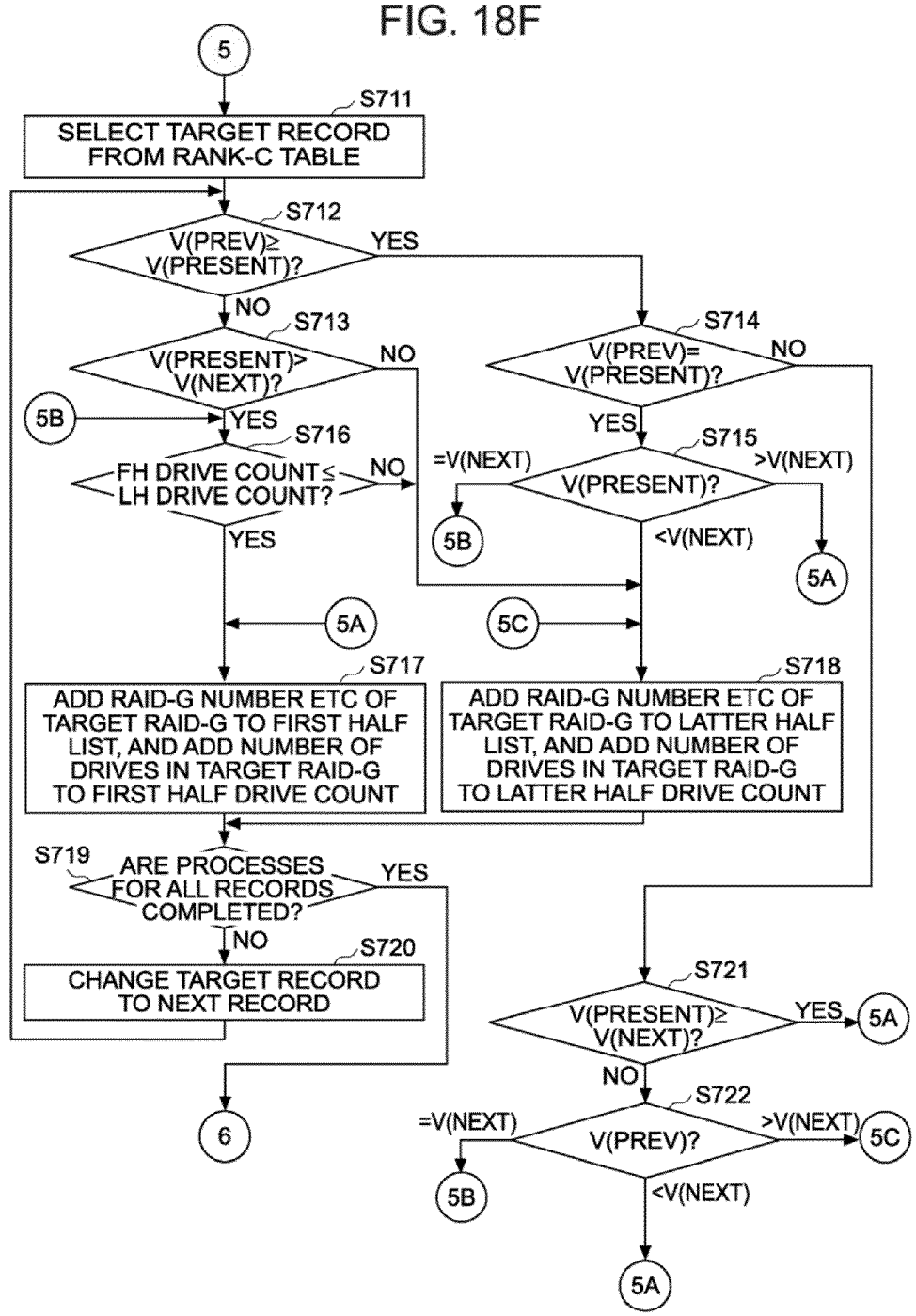
FIG. 18F is a flowchart (part 6) of the division FW application control process.
Figure 18G:
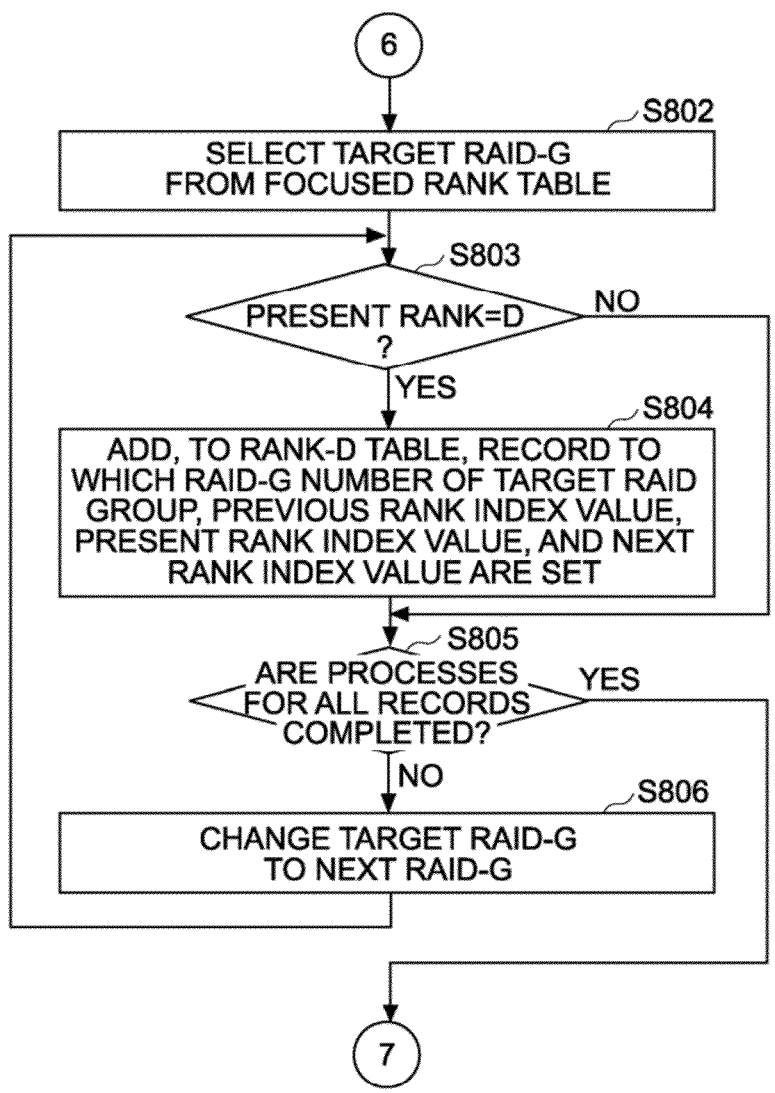
FIG. 18G is a flowchart (part 7) of the division FW application control process.

Specifically, as depicted in FIG. 18A, the schedule control unit 28 starting the division FW application control process, at first, initializes a first half list and a second half list in step S501. Moreover, the schedule control unit 28 initializes, in step S501, a first half drive count and a second half drive count to "0."

The first half list is a list (a storage area on the memory 103) for storing the RAID-G numbers of the RAID-Gs to which the FW should be applied in the first half period together with their ranks for the specified time period. The second half list is a list for storing the RAID-G numbers of the RAID-Gs to which the FW should be applied in the second half period together with their ranks for the specified time period. In the process of step S501, both of the first half list and the second half list are initialized into empty lists.

Further, the schedule control unit 28, in step S501, initializes a rank-A table 80A, a rank-B table 80B, a rank-C table 80C and a rank-D table 80D. FIGS. 19A, 19B, 19C and 19D depict one examples of the rank-A table 80A, the rank-B table 80B, the rank-C table 80C and the rank-D table 80D, respectively. Note that the rank-X tables 80X (X=A through D) illustrated in FIGS. 19A through 19D are tables given not immediately after the initialization but after writing the data thereto.

As obvious from FIGS. 19A through 19D, the rank-X tables 80X are the tables for storing records to each of which a RAID-G number, an previous rank index value, a present rank index value and a next rank index value may be set. In the process of step S501, the respective rank-X tables 80X are initialized into empty tables (which are the tables not retaining the records in which the significant data are set). Note that an in-depth description of each rank index value will be made later on.

The schedule control unit 28 finishing the process of step S501 (FIG. 18A) selects the target RAID-G from within the RAID-Gs of which the identifying information is stored on the focused rank table 60 (FIG. 9) (step S502).

Thereafter, the schedule control unit 28 determines whether the rank (which will hereinafter be termed the present rank) of the specified time range with respect to the target RAID-G, which is stored in the focused rank table 60, is "A" or not (step S503).

If the present rank is not "A" (step S503; NO), the schedule control unit 28 determines whether the processes for all of the RAID-Gs with their identifying information being stored on the focused rank table 60 are completed or not (step S505). Then, the schedule control unit 28, if the processes for all of the RAID-Gs are not yet completed (step S505; NO), changes the target RAID-G to the next RAID-G (step S506), and thereafter restarts the processes from step S503 onward.

Whereas if the present rank is "A" (step S503; YES), the schedule control unit 28 adds, to the rank-A table 80A, the record holding the RAID-G number, the previous rank index value, the present rank index value and the next rank index value with respect to the target RAID-G (step S504).

Herein, the present rank index value of the target RAID-G is a value obtained by digitizing the present rank (the rank of the specified time period of the target RAID-G on the focused rank table 60) on the basis of a conversion rule such as A=0, B=1, C=2 and D=3. The previous rank index value of the target RAID-G is a value obtained by digitizing the rank (referred to as the previous rank) of the time period just anterior to the specified time period with respect to the target RAID-G on the focused rank table 60 on the basis of the conversion rule given above. Similarly, the next rank index value of the target RAID-G is a value obtained by digitizing the rank (referred to as the next rank) of the time period just posterior to the specified time period with respect to the target RAID-G on the focused rank table 60 on the basis of the conversion rule given above.

The schedule control unit 28 finishing the process of step S504 starts the processes from step S505 onward. Then, the schedule control unit 28, when completing the processes for all of the RAID-Gs (step S05; YES), selects a processing target record from the rank-A table 80A (FIG. 18B, step S511). The RAID-G identified by the RAID-G number set in the processing target record will hereinafter be referred to as a target RAID-G. Further, the previous rank index value, the present rank index value and the next rank index value, which are set in the processing target record, are notated such as V (prey), V (present) and V (next), respectively.

The processes in step S512 through step S518 are the processes of basically estimating, based on a magnitude relationship between the rank index values, which half period, the first half period or the second half period, exhibits a lower access frequency, and storing (registering) that the FW application to the target RAID-G is to be conducted in the half period exhibiting the lower access frequency.

The processes in step S512 through step S515 are just the processes of estimating, based on the magnitude relationship between the rank index values, which half period, the first half period or the second half period, exhibits the lower access frequency.

Figure 20A:
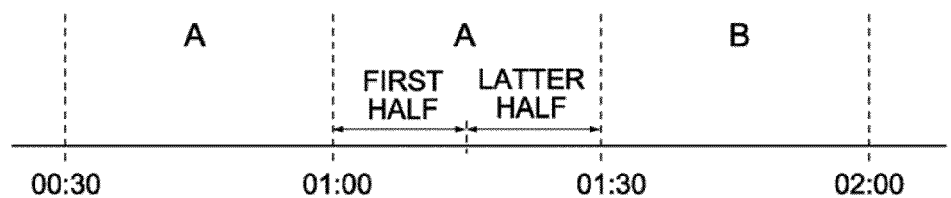
FIG. 20A is an explanatory diagram of the division FW application control process.
Figure 20B:
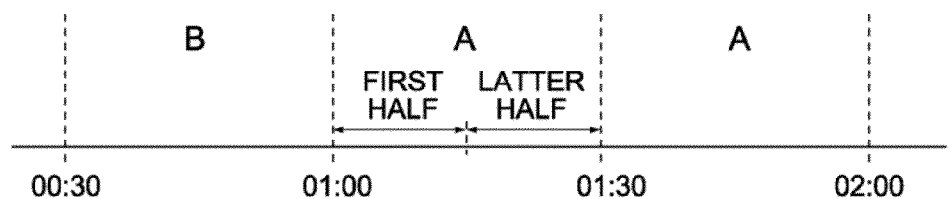
FIG. 20B is an explanatory diagram of the division FW application control process.
Figure 20C:
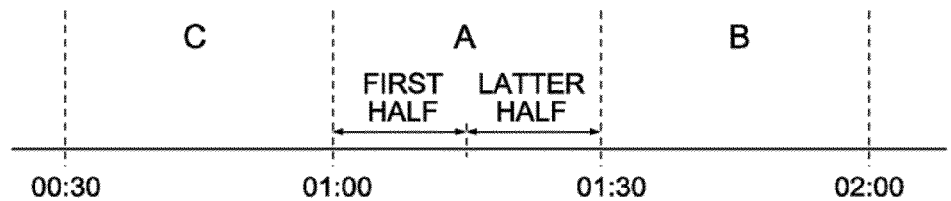
FIG. 20C is an explanatory diagram of the division FW application control process.

The processes of step S512 through step S515 are the processes of determining, if given as illustrated in FIG. 20A, i.e., if the access frequency of the anterior time period is higher (lower) than the access frequency of the posterior time period (if a relationship such as V(prev)<V(next) is established), that the access frequency of the second half period is lower than the other. Further, the processes of step S512 through step S515 are also the processes of determining, if given as illustrated in FIGS. 20B and 20C, i.e., if the access frequency of the previous time period is higher than the access frequency of the next time period (if a relationship such as V(prev)>V(next) is established), that the access frequency of the first half period is lower than that of the second half period.

The process of step S517 (FIG. 18B) is a process, which is executed when estimating the access frequency of the first half period is lower than the other (step S515; NO, step S513; NO, etc.). In the process of step S517, a combination of the RAID-G number of the target RAID group and the rank "A" (the rank of the specified time period with respect to the target RAID group) is added to the first half list, and the number of the drives configuring the target RAID group is added to the first half drive count.

Moreover, the process of step S518 is a process executed when estimating the access frequency of the second half period is lower than the other (step S515; NO, step S513; NO, etc.). In the process of step S518, a combination of the RAID-G number of the target RAID group and the rank "A" is added to the second half list, and the number of the drives configuring the target RAID group is added to the second half drive count.

As described above, in the processes of step S512 through step S515, the half period exhibiting the lower access frequency is estimated based on the rank index value, however, a relationship "V (prey)=V (next) " is established, in which case the magnitude relationship between the access frequencies of the half periods may not be estimated from the rank index values. Hence, in this case, it follows that the RAID-G number of the target RAID-G may be added to either of these tables in terms of the access frequency. It is not, however, preferable that there is a large difference between the second half drive count and the first half drive count. Therefore, if the relationship "V(prev)=V(next)" is established (step S513; NO), a scheme is that the determination in step S516 is made and the RAID-G number of the target RAID-G is added to the table with the smaller number of drives.

The schedule control unit 28, which has finished the process of step S517 or S518, determines whether the processes for all of the records in the rank-A table 80A are completed or not (step S519). If the processes for all of the records are not completed (step S519; NO), the schedule control unit 28 changes the processing target record to the next record (step S520), and thereafter restarts the processes from step S512 onward.

Whereas if the processes for all of the records are completed (step S519; YES), the schedule control unit 28 performs the procedures depicted in FIG. 18C.

Namely, the schedule control unit 28 conducts the processes (steps S602 through S606) of adding the record to the rank-B table 80B in the same procedures as the procedures (FIG. 18A) when adding the record to the rank-A table 80A.

When completing the addition of the record to the rank-B table 80B (step S605; YES), the schedule control unit 28 executes the processes in the procedures depicted in FIG. 18D.

That is, the schedule control unit 28 estimates which half period exhibits the lower access frequency on a record-by-record basis (steps S611, S620) within the rank-B table 80B (steps S612-S616, S621, S622). Incidentally, a reason why the number of determination steps is larger than in FIG. 18 is that there may be established a relationship ("V(prev)<V (present)", etc.) which may not be established if the present rank is "B" and if the present rank is "A."

Further, the schedule control unit 28, if unable to estimate the magnitude relationship between the access frequencies of the respective half periods from the rank index values (step S613; YES, etc.), determines, from the magnitude relationship between the first half drive count and the second half drive count, the table to which the RAID-G number of the target RAID-G is added (step S616).

Then, the schedule control unit 28, when estimating that the access frequency of the first half period is lower than the other (step S615; >V(next), etc.), adds a combination of the RAID-G number of the target RAID group and the rank "B" to the first half list (step S617). Further, the schedule control unit 28 adds the number of drives of the drives configuring the target RAID group to the first half drive count (step S617).

Moreover, the schedule control unit 28 executes the process of step S617 also when determining, from the magnitude relationship between the first half drive count and the second half drive count, the first half table as the table to which the RAID-G number of the target RAID-G is added (step S616; YES).

The schedule control unit 28, when estimating that the access frequency of the second half period is lower than the other (step S615; <V(next), etc.), adds the combination of the RAID-G number of the target RAID group and the rank "B" to the second half list (step S618). Further, the schedule control unit 28 adds the number of the drives configuring the target RAID group to the second half drive count (step S618).

Furthermore, the schedule control unit 28 executes the process of step S618 also when determining, from the magnitude relationship between the first half drive count and the second half drive count, the second half table as the table to which the RAID-G number of the target RAID-G is added (step S616; NO).

Then, the schedule control unit 28, when completing the process of step S617 or S618 with respect to all of the records within the rank-B table 80B (step S619; YES), performs the processes in the procedures illustrated in FIG. 18E.

In short, the schedule control unit 28 executes, in the same procedures as the procedures of adding the records to the rank-A table 80A and the rank-B table 80B (FIGS. 18A and 18C), the process of adding the records to the rank-C table 80C (steps S702 S706).

When completing adding the records to the rank-C table 80C (step S705; YES), the schedule control unit 28 executes the processes in the procedures depicted in FIG. 18F.

Namely, the schedule control unit 28 estimates which half period exhibits the lower access frequency on the record-by-record basis (steps S711, S720) within the rank-C table 80C (steps S712-S715, S721, S722).

Further, the schedule control unit 28, if unable to estimate the magnitude relationship between the access frequencies of the respective half periods from the rank index values (step S713; YES, etc.), determines, from the magnitude relationship between the first half drive count and the second half drive count, the table to which the RAID-G number of the target RAID-G is added (step S716).

Then, the schedule control unit 28, when estimating that the access frequency of the first half period is lower than the other (step S715; >V(next), etc.), adds a combination of the RAID-G number of the target RAID group and the rank "C" to the first half list, and adds the number of drives of the drives configuring the target RAID group to the first half drive count (step S717).

Moreover, the schedule control unit 28 executes the process of step S717 also when determining, from the magnitude relationship between the first half drive count and the second half drive count, the first half table as the table to which the RAID-G number of the target RAID-G is added (step S716; YES).

The schedule control unit 28, when estimating that the access frequency of the second half period is lower than the other (step S716; <V(next), etc.), adds a combination of the RAID-G number of the target RAID group and the rank "C" to the second half list (step S718). Further, the schedule control unit 28 adds the number of drives of the drives configuring the target RAID group to the second half drive count (step S718).

Furthermore, the schedule control unit 28 executes the process of step S718 also when determining, from the magnitude relationship between the first half drive count and the second half drive count, the second half table as the table to which the RAID-G number of the target RAID-G is added (step S716; NO).

Then, the schedule control unit 28, when completing the process of step S717 or S718 with respect to all of the records within the rank-C table 80C (step S719; YES), performs the processes in the procedures illustrated in FIG. 18G.

That is, the schedule control unit 28 executes, in the same procedures as the procedures of adding the records to the rank-A table 80A, etc. (FIGS. 18A, 18C and 18E), the process of adding the records to the rank-D table 80D (steps S802-S806).

When completing adding the records to the rank-D table 80D (step S805; YES), the schedule control unit 28 executes the processes in the procedures depicted in FIG. 18H.

Namely, the schedule control unit 28 estimates which half period exhibits the lower access frequency on the record-by-record basis (steps S811, S820) within the rank-D table 80D (steps S812 S815).

Further, the schedule control unit 28, if unable to estimate the magnitude relationship between the access frequencies of the respective half periods from the rank index values (step S813; YES, etc.), determines, from the magnitude relationship between the first half drive count and the second half drive count, the table to which the RAID-G number of the target RAID-G is added (step S816).

Then, the schedule control unit 28, when estimating that the access frequency of the first half period is lower than the other (step S815; NO, etc.), adds a combination of the RAID-G number of the target RAID group and the rank "D" to the first half list, and adds the number of drives of the drives configuring the target RAID group to the first half drive count (step S817).

Moreover, the schedule control unit 28 executes the process of step S817 also when determining, from the magnitude relationship between the first half drive count and the second half drive count, the first half table as the table to which the RAID-G number of the target RAID-G is added (step S816; YES).

The schedule control unit 28, when estimating that the access frequency of the second half period is lower than the other (step S816; YES, etc.), adds the combination of the RAID-G number of the target RAID group and the rank "D" to the second half list (step S818). Further, the schedule control unit 28 adds the number of drives of the drives configuring the target RAID group to the second half drive count (step S818).

Furthermore, the schedule control unit 28 executes the process of step S818 also when determining, from the magnitude relationship between the first half drive count and the second half drive count, the second half table as the table to which the RAID-G number of the target RAID-G is added (step S816; NO).

Then, the schedule control unit 28, when completing the process of step S817 or S818 with respect to all of the records within the rank-D table 80D (step S819; YES), performs the processes in the procedures illustrated in FIG. 18I.

Namely, the schedule control unit 28 finishing the processes in FIGS. 18A 18H executes at first a process (step S901) of generating a first sequence designation FW application start request from items of information (some couples of RAID-G numbers and ranks) within the first half list.

The process of this step S901 takes the same procedures as those in steps S400 S410 except that the processing target information is not the information in the focused rank table 60 but the information in the first half list (and except that a name of the request to be generated is not the sequence designation FW application start request but the first sequence designation FW application start request).

Subsequently, the schedule control unit 28 performs the process (step S902) of generating a second sequence designation FW application start request from the information in the second half list. The process of this step S902 is the process taking also the same procedures as those in steps S400-S410 except that the processing target information is not the information in the focused rank table 60 but the information in the second half list.

Then, the schedule control unit 28 performs the process (step S903) of transmitting, to the focused CM 12, the first sequence designation FW application start request at the start time (the start time of the first half period) of the specified time range and the process (step S904) of transmitting, to the focused CM 12, the second sequence designation FW application start request at the start time of the second half period, and thereafter finishes this division FW application control process.

Note that though a description into the flowchart is omitted, if it takes 15 min or longer to complete the sequence designation FW application start request generated in the process of step S901 or S902, the schedule control unit 28 notifies the user of this purport without carrying out the processes from step S903 onward. Further, the schedule control unit 28, if unable to confirm, till the start time of the second half period, that there is completed the FW application to all of the RAID-Gs to which the FW is designated by the first sequence designation FW application start request to be applied, notifies the user of this purport without performing the process of step S904.

As discussed so far, the CE 11 (and the master CM 12) of the disk array device 10 according to the second embodiment estimates, from the access ranks of the specified time range (the single rank calculation target time period specified by the user) and the time periods anterior and posterior thereto, which half period, the first half period or the second half period of the specified time range, exhibits the lower access frequency per RAID-G with respect to each RAID-G to which another FW should be applied. Then, the CE 11 (and the master CM 12) applies the FW to each RAID-G within the half period (time period) estimated to have the lower access frequency.

It therefore follows that the CE 11 (or the master CM 12) according to the second embodiment may apply the FW to each RAID-G in such a form that the possibility of the save data storage area 220 reaching the full capacity during the FW application is lower than by the CE 11 (or the master CM 12) according to the first embodiment.

<<Modified Modes>>

The technologies of the respective embodiments may be modified in a variety of forms. For example, the disk array device 10 according to each embodiment may be modified into a device configured so that each CM 12 independently determines the FW application timing of the RAID-G of which the self-CM 12 takes charge. Furthermore, the disk array device 10 according to each embodiment maybe also modified into a device configured to perform a process corresponding to the second FW application control process or the division FW application control process if the specified number is equal to or larger than "2" (FIG. 13: S304; YES).

Moreover, as a matter of course, the disk array device 10 according to each embodiment is modified into a device configured not to make the adjustment of the rank (FIG. 8) and a device configured to generate tables/requests that are different in their specific formats from those described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A RAID group control device for performing access control over one or more RAID groups each having redundancy, the device comprising:
   an acquiring unit configured to acquire access frequency information with respect to a RAID group among the one or more RAID groups;
   a scheduling unit configured to find a time period exhibiting a lower access frequency than access frequencies of anterior and posterior time periods in a specified time range on the basis of the access frequency information, and to determine start timing of a process of rewriting firmware of drives belonging to the RAID group on the basis of the found time period; and
   a firmware rewrite processing unit configured to start the process of rewriting the firmware of the drives at the determined start timing.

2. The RAID group control device according to claim 1, wherein the acquiring unit acquires access frequency information with respect to each of the one or more RAID groups, and
   the scheduling unit, if there is a RAID group in which the time period exhibiting the low access frequency is not found, determines the start timing of the RAID group in a time period different from the time periods found with respect to other RAID groups.

3. The RAID group control device according to claim 1, further comprising a request response unit configured to make a response to a read/write request with respect to the RAID group including an in-firmware-application drive undergoing the firmware application process,
   wherein the request response unit processes the read request for the RAID group including the in-firmware-application drive by controlling the drives in the RAID group excluding the in-firmware-application drive,
   the request response unit processes the write request for the RAID group including the in-firmware-application drive by controlling the drives in the RAID group excluding the in-firmware-application drive and storing, in an information storage area, data that should be written to the in-firmware-application drive and write location information indicating a storage area of the in-firmware-application drive to which the data should be written and the in-firmware-application drive, and
   the request response unit writes, after completing the firmware application process for the in-firmware-application drive, each item of data that should be written back to the in-firmware-application drive, which is stored in the information storage area, back to the in-firmware-application drive on the basis of the write location information, and thereafter erases each item of data written back to the in-firmware-application drive and the write location information associated with this data from on the information storage area.

4. The RAID group control device according to claim 3, wherein the scheduling unit determines the start timing of the RAID group by predicting a status of how much the information storage area is used when executing the firmware application process for each in-firmware-application drive.

5. The RAID group control device according to claim 1, wherein the acquiring unit acquires the access frequency information containing access counts at intervals of a predetermined period of time, and
   the scheduling unit finds, based on the access frequency information, the time period exhibiting the lower access frequency than those of the anterior and posterior time periods and being shorter than the predetermined period of time, and determines, based on the found time period, the start timing of the firmware rewriting process of the drive belonging to the RAID group.

6. A RAID group control device configured to control a content corresponding to a read/write request inputted from a host device with respect to a plurality of RAID groups having redundancy, the device comprising:

a retaining unit configured to retain an access frequency history related to each of the plurality of RAID groups;

an updating unit configured to monitor an access status to each of the plurality of RAID groups, and to update the access frequency history retained by the retaining unit and related to each of the RAID groups on the basis of a result of monitoring the access statuses to the RAID groups;

a scheduling unit configured to determine a prospective time period exhibiting an access frequency that is lower than those of anterior and posterior time periods with respect to each RAID group to which a new piece of firmware should be applied on the basis of the access frequency history retained by the retaining unit and related to each RAID group to which the new firmware should be applied;

a firmware application processing unit configured to sequentially execute the firmware application process that is restarted after the scheduling unit has rewritten the firmware into another firmware for each of the drives configuring each RAID group within the time period determined with respect to each RAID group; and a request response unit configured to make, without using the in-firmware-application drive, a response to the read/write request for the RAID group including the in-firmware-application drive defined as the drive undergoing the firmware application process.

7. The RAID group control device according to claim 6, wherein the request response unit processes the read request for the RAID group including the in-firmware-application drive by controlling the drives in the RAID group excluding the in-firmware-application drive, the request response unit processes the write request for the RAID group including the in-firmware-application drive by controlling the drives in the RAID group excluding the in-firmware-application drive and storing, in a predetermined information storage area, data that should be written to the in-firmware-application drive and write location information indicating a storage area of the in-firmware-application drive to which the data should be written and the in-firmware-application drive in a form that makes recognizable an associative relation between the storage area and the in-firmware-application drive, and the request response unit writes, after completing the firmware application process for the in-firmware-application drive, each item of data that should be written back to the in-firmware-application drive, which is stored in the predetermined information storage area, back to the in-firmware-application drive on the basis of the write location information stored in the predetermined information storage area, and thereafter erases each item of data written back to the in-firmware-application drive and the write location information associated with this data from on the predetermined information storage area.

8. The RAID group control device according to claim 7, wherein the scheduling unit determines the time period with respect to each RAID group so as to keep an empty storage area remaining in the predetermined information storage area before completing the firmware application process to each in-firmware-application drive.

9. The RAID group control device according to claim 7, wherein the scheduling unit predicts, from the access frequency information about the same time period with respect to the plurality of RAID groups, a usage status of the information storage area in the case of simultaneously setting the plurality of RAID groups as processing target groups of the firmware application processing unit, and the scheduling unit determines the timing about each RAID group so as to make coincident the time periods with respect to the plurality of RAID groups for which to determine that the empty storage area is kept in the predetermined information storage area before completing the firmware application process to each in-firmware-application drive even when simultaneously setting the RAID groups as the processing target groups of the firmware application processing unit.

10. The RAID group control device according to claim 6, wherein the retaining unit retains the access counts at the intervals of the predetermined period of time as the access frequency history, and the scheduling unit determines, based on the access counts at the intervals of the predetermined period of time, which are retained by the retaining unit, with respect to each RAID group to which a new piece of firmware should be applied, the time period exhibiting the lower access frequency than those of the anterior and posterior time periods and being shorter than the predetermined period of time in the future with respect to each RAID group to which the new firmware should be applied.

\* \* \* \* \*